(12) United States Patent
Delong et al.

(10) Patent No.: US 8,532,834 B2
(45) Date of Patent: Sep. 10, 2013

(54) METHOD FOR INTEGRATING CONTROLS FOR CAPTIVE POWER GENERATION FACILITIES WITH CONTROLS FOR METALLURGICAL FACILITIES

(75) Inventors: Garth Delong, Burlington (CA); Ruairi Hynes, Oakville (CA); Jakob Janzen, Toronto (CA)

(73) Assignee: Hatch Ltd., Mississauga (CA)

( * ) Notice: Subject to any disclaimer, the term of this patent is extended or adjusted under 35 U.S.C. 154(b) by 322 days.

(21) Appl. No.: 12/915,703

(22) Filed: Oct. 29, 2010

(65) Prior Publication Data
US 2012/0109390 A1 May 3, 2012

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *H02P 3/00* | (2006.01) |
| *H02P 9/06* | (2006.01) |
| *H02P 15/00* | (2006.01) |
| *H02P 11/00* | (2006.01) |
| *H02P 9/04* | (2006.01) |
| *H02H 7/06* | (2006.01) |
| *F02D 29/06* | (2006.01) |

(52) U.S. Cl.
USPC ........... 700/287; 700/291; 700/295; 700/297; 322/11; 322/17; 322/45; 290/40 C

(58) Field of Classification Search
USPC ........... 700/287, 290, 291, 295, 297; 322/10, 322/11, 14, 15, 17, 22–25, 44, 45; 290/40 R, 290/40 C, 52; 60/643, 645, 652
See application file for complete search history.

(56) References Cited

U.S. PATENT DOCUMENTS

| | | | |
|---|---|---|---|
| 3,076,097 A | 1/1963 | Gorrie et al. | |
| 3,952,138 A | 4/1976 | Nanjyo et al. | |

(Continued)

FOREIGN PATENT DOCUMENTS

| | | |
|---|---|---|
| EP | 0098037 A2 | 1/1984 |
| EP | 2112774 A1 | 10/2009 |

(Continued)

OTHER PUBLICATIONS

Boulet et al., "Control of Non-Ferrous Electric Arc Furnaces," IEEEE Canadian Review, Summer Issue (1997).

(Continued)

*Primary Examiner* — Crystal J Barnes-Bullock
(74) *Attorney, Agent, or Firm* — Bereskin & Parr LLP/S.E.N.C.R.L., s.r.l.

(57) ABSTRACT

A control system for a combined power generation and metallurgical plant facility integrates generator-side and load-side control to provide coordinated operation of the two processes. The power generation facility includes one or more generator units and the metallurgical plant facility includes one or more controllable loads. Operating characteristics of the one or more loads are fed back to the one or generator units through a master controller to determine input control parameters for the one or more generator units. Similarly control signals and operating characteristics of the one or more generators are fed forward to the one or more loads through the master controller to determine input control parameters for the one or more loads. Using feed-forward as well as feedback loops to exchange generator output and load set-point information, power balance between the generator units and controlled loads is maintained within an operating envelope.

37 Claims, 16 Drawing Sheets

(56) References Cited

U.S. PATENT DOCUMENTS

| | | | |
|---|---|---|---|
| 4,096,344 A | 6/1978 | Munson | |
| 4,222,229 A | 9/1980 | Uram | |
| 4,287,430 A * | 9/1981 | Guido | 290/40 C |
| 4,308,463 A * | 12/1981 | Giras et al. | 290/40 R |
| 4,314,441 A * | 2/1982 | Yannone et al. | 60/39.281 |
| 4,450,363 A | 5/1984 | Russell et al. | |
| 4,455,614 A | 6/1984 | Martz et al. | |
| 4,728,254 A * | 3/1988 | Schmitz-Josten et al. | 415/13 |
| 5,239,557 A | 8/1993 | Dent | |
| 5,412,252 A * | 5/1995 | Moradian et al. | 290/40 R |
| 5,617,447 A | 4/1997 | Tambe | |
| 6,169,334 B1 | 1/2001 | Edelman | |
| 6,281,601 B1 | 8/2001 | Edelman et al. | |
| 6,301,895 B1 | 10/2001 | Kallina et al. | |
| 6,573,691 B2 | 6/2003 | Ma et al. | |
| 6,579,206 B2 | 6/2003 | Liu et al. | |
| 6,664,653 B1 | 12/2003 | Edelman | |
| 6,788,031 B2 * | 9/2004 | Pendell | 322/44 |
| 6,850,074 B2 * | 2/2005 | Adams et al. | 324/527 |
| 7,161,257 B2 * | 1/2007 | Lakov et al. | 290/40 R |
| 7,212,561 B2 | 5/2007 | Sedighy et al. | |
| 7,212,562 B2 | 5/2007 | Ma | |
| 7,257,146 B2 | 8/2007 | Sedighy et al. | |
| 7,536,240 B2 | 5/2009 | McIntyre et al. | |
| 7,564,147 B2 | 7/2009 | Michalko | |
| 7,592,784 B2 * | 9/2009 | Qi et al. | 322/24 |
| 7,612,466 B2 | 11/2009 | Skutt | |
| 8,082,067 B2 * | 12/2011 | Nicoson | 700/290 |
| 8,261,717 B2 * | 9/2012 | Peotter et al. | 123/350 |
| 2004/0061380 A1 | 4/2004 | Hann et al. | |
| 2008/0063024 A1 | 3/2008 | Pasch et al. | |
| 2009/0097959 A1 | 4/2009 | Vos et al. | |
| 2011/0160979 A1 * | 6/2011 | Muller | 701/100 |
| 2011/0164439 A1 * | 7/2011 | Berton et al. | 363/21.09 |

FOREIGN PATENT DOCUMENTS

| | | |
|---|---|---|
| JP | 2000032658 A | 1/2000 |
| JP | 2005184933 A | 7/2005 |
| WO | 2004029749 A2 | 4/2004 |
| WO | 2004029749 A3 | 4/2004 |
| WO | 2009072453 A1 | 6/2009 |

OTHER PUBLICATIONS

Shibata, M., "Integrated Control of Power Generation Facilities in Paper Plants," Yokogawa Technical Report English Ed., No. 42 (2006).

Hooshmand et al., "Optimal Design of TCR/FC in Electric Arc Furnaces for Power Quality Improvement in Power Systems," Leonardo Electronic Journal of Practices and Technologies, Issue 15, Jul.-Dec. 2009 (p. 31-50).

International Search Report and Written Opinion issued in corresponding PCT Application No. PCT/CA2011/001165 (date of mailing Jan. 17, 2012).

* cited by examiner

METHOD FOR INTEGRATING CONTROLS FOR CAPTIVE POWER GENERATION FACILITIES WITH CONTROLS FOR METALLURGICAL FACILITIES

FIELD

The described embodiments relate generally to integrated control systems for controlled electrical loads and generators, and more particularly to integrated control systems for captive power generation and metallurgical facilities.

BACKGROUND

Utility power plants are generally operated based on a control scheme designed to regulate the generating unit power output, in order to meet a power demand set-point selected for one or more loads and thereby to maintain overall power balance in the electrical system. To provide generator power regulation, control strategies have been developed which link the automatic operation of a unit's boiler and turbine generator to act in a coordinated fashion and respond to long-term changes in power demand. These control strategies, which have become relatively standard in the power generation industry, generally involve performing a form of frequency control at the turbine level. By monitoring deviations of the turbine generator's rotational frequency, changes in electrical power demand are matched, in a reactionary manner, through a corresponding change in the mechanical power provided by the boiler. Thus, overall power balance in the system is preserved.

Response systems for handling short-term trends in power demand or other unanticipated electrical load transients have also been developed and integrated into some utility power plants. Transients such as a load rejection or switch-off can require an immediate turbine response due to the reduction in load demand. High-pressure and low-pressure bypass systems can be used to reduce electrical output by routing excess steam from the generating unit's boiler to a condenser (by-passing the turbine) until the boiler, with its generally high thermal inertia, has time to respond and lower its mechanical output to match the reduced steam demand of the turbine. If there is no high-pressure or low-pressure bypass system installed, an electromechanical relief valve (ERV) can be used alternatively to release excess steam into the atmosphere in response to pressure buildup, thereby reducing the supply of steam to the turbine to meet demand. However, atmospheric release of steam can lower overall plant efficiency due to the energy waste. For transients that increase power demand, such as load switch-on, a similar bypass system can be used to route additional steam to the turbine, assuming a source of available steam has been incorporated into and is presently enabled within the bypass system, until the boiler has time to catch up its steam output to meet the increased demand.

SUMMARY

In one broad aspect, some embodiments provide a control system for coordinating operation of a power system comprising at least one generator and at least one controlled load. The control system includes: a generator controller associated with each at least one generator and responsive to generator control parameters for controlling the at least one generator to achieve an overall generator output; a load controller associated with each at least one load and responsive to load control parameters for controlling the at least one load to achieve an overall load set-point; and a master system controller communicatively linked to the generator controller and the load controller and configured to coordinate operation of the at least one generator with the at least one load by generating the load control parameters to achieve the overall load set-point based on an operating characteristic of the at least one generator, and by generating the generator control parameters to achieve the overall generator output based on an operating characteristic of the at least one load.

In another broad aspect, some embodiments provide a power system comprising: at least one generator responsive to generator control parameters for operation at an overall generator output; at least one load responsive to load control parameters for operation at an overall load-set point; and a master system controller coupled to and configured to coordinate operation of the at least one generator with the at least one load by generating the load control parameters to achieve the overall load set-point based on an operating characteristic of the at least one generator, and by generating the generator control parameters to achieve the overall generator output based on an operating characteristic of the at least one load.

In another broad aspect, some embodiments provide a method of coordinating operation of a power system comprising at least one generator and at least one controlled load. The method comprises: monitoring an operating characteristic of the at least one generator; monitoring an operating characteristic of the at least one load; and coordinating operation of the at least one generator with the at least one load by generating load control parameters to achieve an overall load set-point based on the operating characteristic of the at least one generator, and by generating generator control parameters to achieve an overall generator output based on the operating characteristic of the at least one load.

In another broad aspect, some embodiments provide a controller for coordinating operation of a power system comprising at least one generator and at least one controllable load supplied by the at least one generator. The controller comprises: a generator interface for receiving a signal representative of an operating characteristic of the at least one generator and for providing generator control parameters to a generator controller associated with the at least one generator, the generator controller responsive to the generator control parameters for achieving an overall generator output of the at least one generator; a load interface for receiving a signal representative of an operating characteristic of the at least one load and for providing load control parameters to a load controller associated with the at least one load, the load controller responsive to the load control parameters for achieving an overall load set-point of the at least one load; and a processor configured to provide integrated control of the at least one generator and the at least one load by determining the load control parameters to achieve the overall load set-point based on the operating characteristic of the at least one generator, and by determining the generator control parameters to achieve an overall generator output based on the operating characteristic of the at least one load.

In another broad aspect, some embodiments provide a power plant comprising: at least one generator configured to supply power to at least one controllable load, the at least one generator responsive to generator control parameters for operation at an overall generator output and the at least one load responsive to load control parameters for operation at an overall load set-point; and a master system controller coupled to and configured to coordinate operation of the at least one generator with the at least one load by generating the load control parameters to achieve the overall load set-point based on an operating characteristic of the at least one generator, and by generating the generator control parameters to achieve the overall generator output based on an operating characteristic of the at least one load.

These and other aspects are set forth herein.

BRIEF DESCRIPTION OF THE DRAWINGS

A detailed description of embodiments, including a preferred embodiment, is provided herein below with reference to the following drawings, in which.

Figure 1:
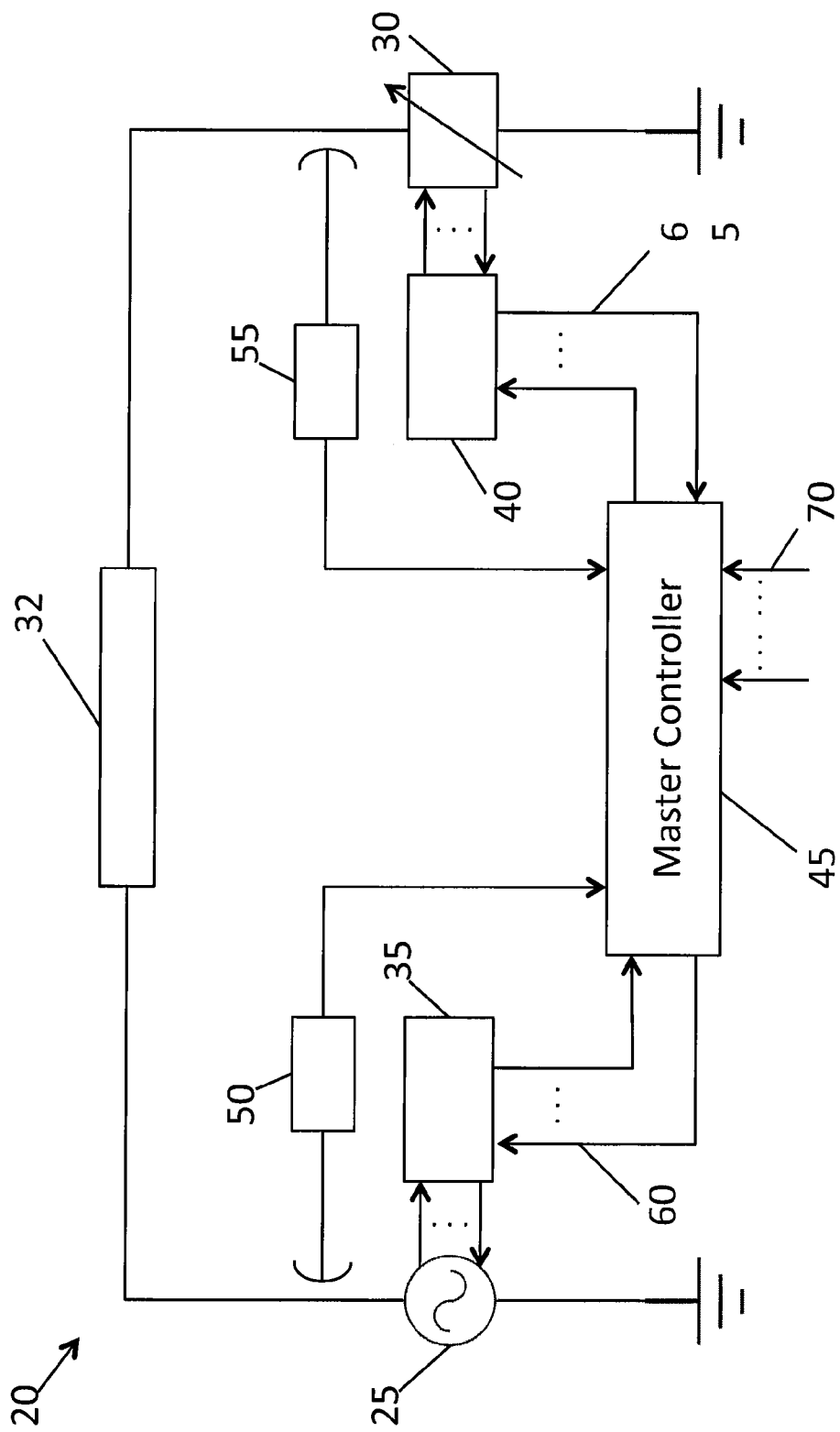
FIG. 1 illustrates, in a simplified circuit diagram, a system with integrated generator-side and load-side power control.

It will be understood that the drawings are exemplary only. All reference to the drawings is made for the purpose of illustration only and is not intended to limit the scope of the embodiments described herein below in any way. For convenience, reference numerals may also be repeated (with or without an offset) throughout the figures to indicate analogous components or features.

DESCRIPTION OF EXEMPLARY EMBODIMENTS

Large metallurgical plants and facilities, such as those used in smelting and other metallic ore processes, can represent significant and challenging loads for a generator facility. Some examples of these facilities include electric arc furnaces (EAF) and ladle furnaces (LMF). The power draw of an arc furnace is typically large, reactive (but can also include a real component), and highly variable. If the metallurgical plant is connected to a large and robust power grid, even large power fluctuations at the arc furnace during operation may represent only a small disturbance overall from the perspective of the power generators supplying the grid. As a result, coordinated generator control, even without any power regulation on the load side, may be adequate to stabilize the power grid, limit frequency excursions and avoid catastrophic equipment failure.

Load power stabilization may, however, still be implemented to maintain good power balance and efficient operation of the metallurgical plant. Control schemes for arc furnaces (both DC and 3-phase) are described in, for example, U.S. Pat. Nos. 6,603,795, 7,212,561, 7,212,562 and 7,257,146, the entire contents of each of which are hereby incorporated by reference. These control schemes utilize one of more different techniques to stabilize power consumption around a set point, including variable reactor control, input feed control and electrode height regulation. Also described are control schemes to regulate multiple arc furnaces to an overall power set-point across all loads operating in the power system. If through one of the described schemes the load (or loads) can be regulated to a desired power set point, long-term trends in system power demand (e.g., set-point changes) can then be matched on the generator-side to within acceptable performance criteria, for example, using the turbine-level frequency control and, if necessary, the bypass schemes described above.

However, many metallurgical facilities are built in remote locations where access to a power grid may not always be convenient, or even be possible at all. In these cases, "captive" or "islanded" power generation facilities, which are totally isolated from the power grid, can be built and used as the sole source of power for the metallurgical facility. Maintaining a balance between electrical generation and electrical consumption in a captive generation facility can be important for reliable operation of the plant. Significant mismatching of the generator output and load power set-points can result in large frequency excursions causing harmonic and other distortion on the system bus, which both lowers the overall efficiency of the power plant and tends to increase equipment wear and damage resulting in increased maintenance costs in the long run. In perhaps a worst-case scenario, a significant enough power imbalance in the plant can cause generator shutdown and total loss of plant power, as well as other forms of generator failure, leading to complete shutdown of the metallurgical plant. For metallurgical facilities powered solely by captive power generators, traditional coordinated control at the generator running alongside, but not integrated, with power stabilization techniques on the load upswing may not be adequate to handle the full range of power transients that can be expected of large metallurgical power plants. Coordinated generator control may not be fast enough on its own to meet changing load demands without destabilizing overall power balance in the plant.

The embodiments described herein provide a system for integrating the control of a power generation facility with the control of a metallurgical plant, thereby coordinating operation of the two processes. In the coordinated control system, control signals and/or operating characteristics of one or more loads, which can include power set-points, are relayed to one or more generator units installed in the power system through a master system controller to determine input control parameters for the one or more generator units. By receiving the input control parameters, associated generator controllers can then regulate the one or more generator units to achieve a desired generator output. Similarly control signals and/or operating characteristics of the one or more generators, which can include power output capabilities, are relayed to the one or more loads through the master system controller to determine input control parameters for the one or more loads. Again by receiving the input control parameters, associated load controllers can then regulate the one or more loads to achieve an overall load power set-point. Both feed forward and feed back control loops between the power generator and metallurgical plant facilities can be used to automatically coordinate the operation of each facility within respective stability envelopes. The active exchange of operating characteristics and other control information between the generators and loads adds a level of predictive control to supplement the reactive control schemes described above.

Although the embodiments described herein make primary reference to metallurgical facilities and industrial turbine generators, it should be appreciated that the embodiments may also be applicable to any facility in which at least one generator is used to power at least one controlled electrical load, which can be large and highly variable. The embodiments are also described primarily in the context of a captive generation facility, but may also be suitable for other industrial applications.

Although the embodiments described herein make primary reference to loads powered by captive power generation facilities, the embodiments may also be used in systems by hybrid power sources, including a local or captive power generation facility that supplements or is supplemented by power obtained from a power grid or other power source. While components in the power grid may be adapted to resist failure resulting to variations in the load, it may be desirable to integrate control of the load with control of the local or captive power generation facility to reduce the risk of the local or captive power generation facility failing.

Reference is now made to FIG. 1, which shows a simplified circuit diagram of a power system 20 with integrated generator-side and load-side power control. In some embodiments, the power system 20 can represent a captive power generator and metallurgical plant facility. The power system 20 comprises generator 25 coupled to controlled electrical load 30 across system bus 32, which can have both a resistive and an inductive component. The generator 25 is any industrial-scale power generator, such as a circulating fluidized bed (CFB) boiler/steam turbine generator (STG) or combustion turbine generator (CTG), which is controlled by unit coordinator 35 for operation at a range of different power output levels not exceeding a maximum output capability. For example, the unit coordinator 35 can control valve positions for the generator turbine in order to regulator power output. At the same time, the unit coordinator 35 can also control boiler levels synchronously with the valve positions for coordinated operation of the generator 25. In addition to active power output control, generator 25 can also implement turbine-level frequency control and/or high and low-pressure bypass systems for regulating output based on changing demand within the power system 20. These forms of generally reactionary control supplement the active output level control performed by the unit coordinator 35. The generator 25 can be connected to a power grid (not shown), but in at least some embodiments, the generator 25 can be a "captive" or "islanded" generator, substantially isolated from major power girds. In some embodiments, the generator 25 may serve as the sole or primary source of power for the load 30, while in other embodiments, the generator 25 may be one of many generating units sharing in the supply of power to the load 30.

The load 30 can be a large metallurgical plant, such as a dc or 3-phase electric arc furnace (EAF) or ladle furnace (LMF), having a large and highly variable power draw. The power drawn by the load 30 can include both real and reactive power components and, in at least some cases, can include a substantial reactive component if not regulated. The load 30 is controlled by an associated load controller 40 for operation at one or more different load set-points according to control parameters applied by the load controller 40. The load control parameters can include both reference levels at which the load 30 is to be regulated, as well as other control parameters to influence the transient performance of the load 30. For example, the load controller 40 can implement one of the control schemes described in U.S. Pat. No. 6,603,795, incorporated herein by reference. As some non-limiting examples, the load controller 40 can regulate to load 30 at each of a complex power set-point (single or 3-phase), a real or reactive power set-point (single or 3-phase), a power angle set-point, a current set point (single or 3-phase), a voltage set point (single or 3-phase), an impedance set-point, and the like. The load 30 can be a 3-phase load, such as an ac electric arc furnace, but alternatively a single-phase load, such as a dc electric arc furnace. As used herein throughout, it should be understood that the term "set-point" can refer to a reference or regulation level for the load 30 (as opposed to instantaneous measured levels) that the load controller 40 attempts to achieve. Thus, the load 30 can be regulated to one or more different set-points under the influence of the load controller 40 and in response to the control parameters provided to the load controller 40.

A master system controller 45 provides bilateral communication and exchange of data between the unit coordinator 35 and the load controller 40 for coordinating operation of the generator 25 with operation of the load 30. A generator sensor 50 monitors one or more operating characteristics of the generator 25 and is coupled to the central controller 40, which is configured to receive the operating characteristic information from the generator sensor 50. For example, generator sensor 50 can provide instantaneous measurements of the generator output power, supply voltage, supply current, power factor, real and/or reactive power, system frequency, harmonic content. Optionally, one or more digital to analog converters (not shown) can also be included in the generator sensor 50 to sample and digitize the measured data. The generator sensor 50 can also monitor the operational status of different equipment included in the generator 25 for the purpose of determining generator supply capability. For example, depending on how much redundancy has been designed into the generator 25, generator supply capability can be fractionally reduced if a redundant system fails or is taken offline.

The load sensor 55 monitors one or more operating characteristics of the load 30 and provides the operating characteristic information of the load 30 to the master system controller 45 with which the load sensor 55 is coupled. The monitored operating characteristics can include, for example, instantaneous measurements of load complex power, real power, reactive power, load voltage, load current, power angle, and others. Optionally, one or more digital to analog converts (not shown) can also be included in the load sensor 55 to sample and digitize the measured data.

The master system controller 45 is linked to the unit coordinator 35 using data communication line 60, and to the load controller 40 by way of data communication line 65. Each of the data communication lines 60 and 65 can include multiple data channels in each direction, without limitation, so that any number of system parameters as required can be exchanged bilaterally between the unit coordinator 35 and load controller 40 under the coordination of master system controller 45.

Using the bi-lateral data communication line 60, master system controller 45 provides respective input control parameters to the unit coordinator 35 for controlling operation of the generator 25 to achieve a desired generator output. The master system controller 45 determines the generator control parameters based on one or more operating characteristics, such as power set-points, measured values or other control signals, of the load 30. In parallel fashion, master system controller 45 provides respective input control parameters to the load controller 40 for controlling operation of the load 30 to achieve a desired load set-point, and determines the load control parameters based on one or more operating characteristics, such as output capabilities or ramp rate limits, measured values or other control signals, of the generator 25.

Optionally, master system controller 45 also includes external inputs 70 for receiving, e.g., user-input control commands or parameters or other control information. In such cases, the control input parameters for the unit coordinator 35 and load controller 40 can also be determined based upon the externally received user-input control commands.

The master system controller 45 is configurable to generate different control parameters for the unit coordinator 35 and the load controller 40, depending on the requirements or particular application of the power system 20. For example, in some embodiments, the master system controller 45 determines a unit power demand of the generator 25 based on the power set-point of the load 30. Data communication line 60 is used to provide the unit power demand to the unit coordinator 35, which then controls boiler levels and turbine valve positions in the generator 25 to regulator the power output of the generator 25 to match the specified unit power demand. As the power set-point of the load 30 is varied, the load controller 40 feeds the new power set-point forward to the master system controller 45 (by way of data communication line 65). The master system controller 45 receives and relays this operating characteristic information to the unit coordinator 35, with or without adjustment, so that the power output of the generator 25 can be matched to the new load power consumption. The power set-point of the load 30 can be varied according to a schedule change, but can also be adjusted as necessary in the event of unanticipated load rejections.

Additionally, in some embodiments, the master system controller 45 can also monitor instantaneous power consumption of the load 30 using sensor 55. Either in addition or as an alternative to the unit coordinator 35 performing active feed forward control of generator output based on the load power set-point, the unit coordinator 35 can also perform reactive control (e.g., frequency control) based on the measured instantaneous load power. The frequency control can operate synchronously with and supplement the feed forward control, because of which the frequency control need not be as robust or aggressive necessarily.

The unit coordinator 35 also provides a unit power capability limit to the master system controller 45 using data communication line 60, which represents the maximum available power output of the generator 25 during operation. Typically, the generator 25 will be designed to have a maximum power output capability during continuous, normal operation. However, the output capability of the generator 25 can change during operation due to equipment failure. The unit coordinator 35 monitors different equipment or safety systems within the generator 25 to determine if that equipment or system is functioning properly and, based upon this feedback, determines the present output capability of the generator 25. In some cases, redundancy can be built into the generator 25 so that, if a particular piece of equipment were to fail, one or more redundant systems would still be in place and operational. As a result, generator output would only drop fractionally. For example, if one of two cooling fans were to fail, generator output capability could drop by half instead of to zero, which might be the case if the redundancy had not been built in.

In any event, unit coordinator 35 monitors generator equipment to determine the output capability of the generator 25. Having received the generator output capability from the unit coordinator 35, the master system controller 45 then sets an effective operating limit on the power set-point of the load 30. Thus, if the load power set-point selected by the load controller 40 were higher than the generator output capability, which could happen if the generator output capability were suddenly to drop, the master system controller 45 automatically lowers the load set-point to be within the unit capability limit of the generator 25. Otherwise if the selected load power set-point is already within the unit capability limit of the generator 25, the master system controller 45 takes no action.

To ensure that the reaction time of the generator 25 to changing load power demand is adequately fast, the master system controller 45 also imposes limits on the rates (hereinafter "ramp rate limits") at which the load controller 40 can raise or lower different set-points of the load 30, such as the power set-point. The positive ramp rate limit (i.e., the maximum rate at which the load set-point is increased) may not necessarily be the same as the negative ramp rate limit (i.e., the maximum rate at which the load set-point is decreased), and is generated at the unit coordinator 35 based upon corresponding ramp rate limits imposed on the power output of the generator 25. To ensure coordinated operation of the generator 25 and load 30 during an operational set-point change, the ramp rate limits imposed on the load 30 will typically, though not necessarily, correspond to the effective ramp rate limits of the generator 25. In some embodiments, the master system controller 45 can generate ramp rate limits for the load 30 based on the ramp rate limits of the generator 25. Operator input can also be used to specify the generator ramp rate limits in some embodiment. However, the unit coordinator 35 may also determine or adjust the generator ramp rate limits based on monitored operating characteristics of the generator 25, such as boiler levels or turbine stress limits. The master system controller 45 receives and relays the generator ramp rate limits to the load controller 40 for application to the load 30. Thus, during a load set-point change, the load controller 40 will ramp the load set-point up or down according to the prescribed rate limit, affecting the transient behaviour of the load 30. Doing so permits the unit controller 35 to adjust generator output synchronously, maintaining adequate power stability envelopes within the power system 20.

In some embodiments, the master system controller 45 is also configured to coordinate ramp increase or ramp decrease holds imposed on the load 30. By monitoring different operating characteristics of the generator 25, the unit coordinator 35 can determine that a load set-point ramp currently in progress should be suspended. This can happen, for example, if a monitored operating characteristic of the generator 25 deviates from a prescribed operating range. In some cases, the operating characteristic can exceed a maximum safe value, while in other cases, the operating characteristic can drop below a minimum safe value. In either case, the unit coordinator 35 determines that a load set-point ramp in progress should be suspended until the fault clears and the monitored operating characteristic is restored to the prescribed safe operating range. Holds can be imposed to block the power set-point of the load 30 from being increased (while simultaneously permitting decrease, if requested by the load controller 40), or alternatively to block the power set-point of the load 30 from being decreased (while simultaneously permitting increase). Alternatively, the master system controller 45 can simultaneously block both increases and decreases in the power set-point of the load 30. For example, if the load set-point is being increased and the unit coordinator 35 determines that the boiler drum level is too low, then a hold on the ramp increase can be imposed until the drum level is brought back up to a safe level. If the unit coordinator 35 does not impose a block on the ramp increase, the boiler drum level could drop low enough to cause complete boiler failure or other damage.

The master system controller 45 can be implemented using a combination of hardware and/or software components. For example, master system controller 45 can be implemented on a programmable processing device, such as a microprocessor or microcontroller, Programmable Logic Controller (PLC), Central Processing Unit (CPU), Digital Signal Processor (DSP), Field Programmable Gate Array (FPGA), general purpose processor, and the like. The programmable processing device can be coupled to program memory, which stores instructions used to program the programmable processing device to execute the functions and/or routines of the master system controller 45. The program memory can include non-transitory storage media, both volatile and non-volatile, and including random access memory (RAM), dynamic random access memory (DRAM), static random access memory (SRAM), read-only memory (ROM), programmable read-only memory (PROM), erasable programmable read-only memory (EPROM), electrically erasable programmable read-only memory (EEPROM), flash memory, magnetic media, and optical media.

Although the power system 20 has been described in terms of some specific operating characteristics and control parameters of the generator 25 and load 30, it should be appreciated that the master system controller 45 is not necessarily limited to only those specifically described. The configuration of master system controller 45 can be extended to determine and provide additional control parameters to the generator 25 and/or load 30 not specifically described, and which can also be based upon other operating characteristics, set-points, and/or logic/reference values not specifically described.

Figure 2:
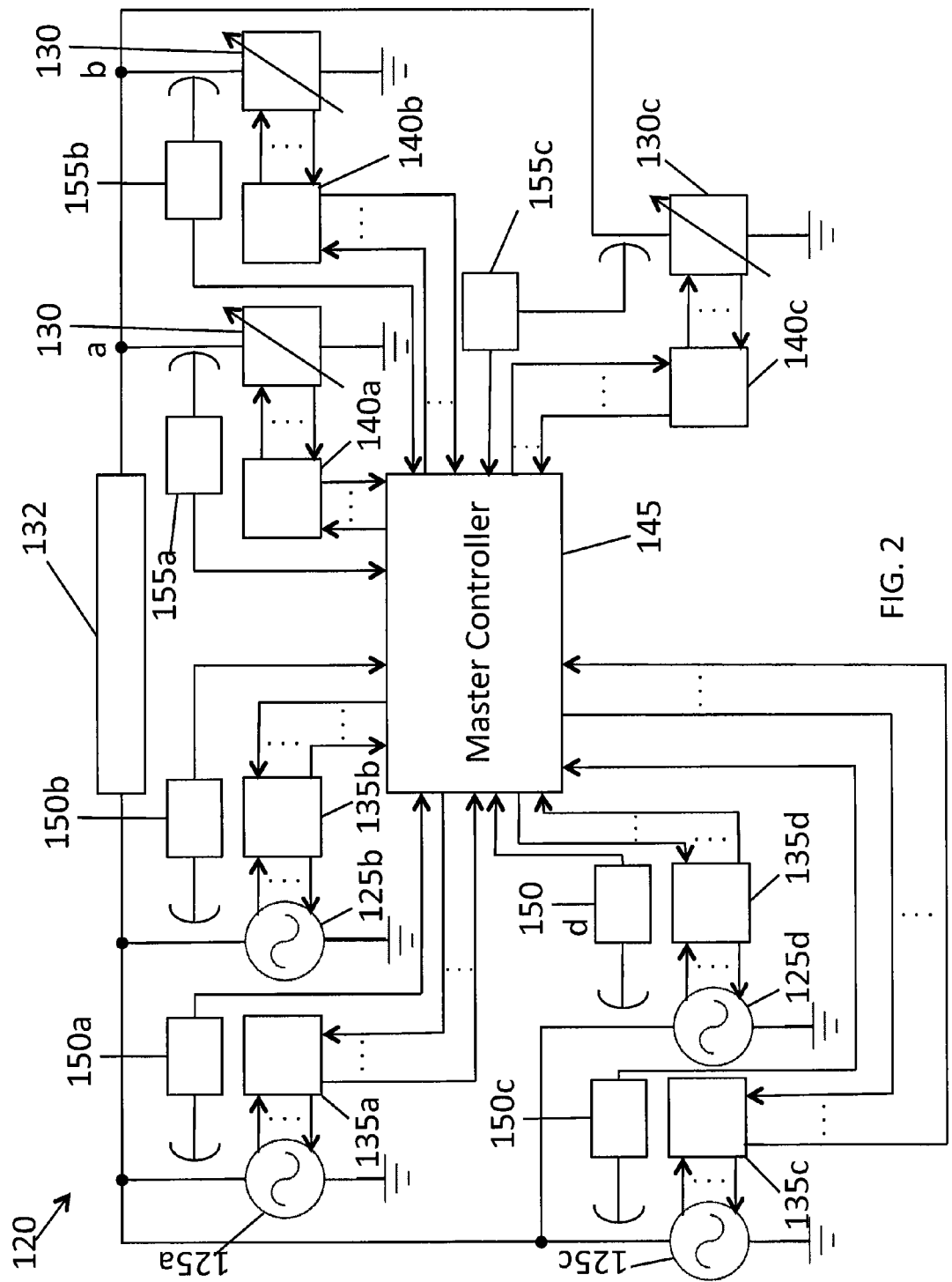
FIG. 2 illustrates, in a simplified circuit diagram, another system with integrated generator-side and load-side power control.

Reference is now made to FIG. 2, which illustrates a simplified circuit diagram of a power system 120 with integrated generator-side and load-side power control. The power system 120 is similar to the power system 20, but includes multiple generators and multiple loads, as opposed to a single generator 25 and a single load 30 (FIG. 1). Accordingly, the power system 120 comprises a plurality of generators 125a-d connected to the system bus 132 in parallel configuration. Generators 125a and 125b can each be circulating fluidized bed (CFB) boiler/steam turbine generator (STG) units of a specified electrical power output (e.g., 110 MWe), while generators 125c and 125d can each be, for example, combustion turbine generators (CTG). In general, generators 125a-d are used to supply power to a plurality of controllable metallurgical loads 130a-c connected across system bus 132. In some embodiments, the power system 120 can be part of a captive facility, so that generators 125a-d provide the sole or primary source of power for the loads 130a-c. However, in alternative embodiments, the power system 120 can be connected to a utility power grid.

Loads 130a and 130b can each be ac or dc electric arc furnaces (EAF). Load 130c can be a ladle furnace (LMF) used for such purposes as recovering alloy elements from the slag generated by the electric arc furnaces 130a and 130b, but also for pre-heating input feed material to the electric arc furnaces 130a and 130b. Typically, though not necessarily, the two electric arc furnaces 130a and 130b can represent a large and highly variable power draw, real and/or reactive, for the generators 125a-d. Power fluctuations, transients or set-point changes of up to or exceeding 50 MWe, for example, could be expected for the power system 120. Compared to the electric arc furnaces 130a and 130b, the ladle furnace 130c may typically represent a smaller power draw of about 10 MWe, for example, which is alternately switched on and off with some frequency during operation of the electric arc furnaces 130a and 130b. However, other modes of operation of the loads 130a-c are possible as well.

In this configuration, CFB/STG generators 125a and 125b can be operated as primary sources of power within the power system 120, in which inclusion of two equally sized generators provides a measure of redundancy. Thus, if one of the CFB/STG generators 125a and 125b were to experience a fault or to be taken offline (e.g., for scheduled maintenance), then primary power production in the power system 120 would only be reduced by half. With CFB/STG generators 125a and 125b responsible for primary power generation, the two CTG generators 125c and 125d can be utilized within the power system 120 as fast response, secondary power generators to handle any power shortfall in the CFB/STG generators 125a and 125b during load peaking, or if one were to fail or be taken offline. However, other uses for CTG generators 125c and 125d may be apparent. Other types of industrial-scale power facilities can also be used to implement generators 125a-d, in alternative embodiments.

Unit coordinators 135a and 135b are associated with CFB/STG generators 125a and 125b, respectively, and function similar to unit coordinator 35 (shown in FIG. 1). Similarly CTG master controllers 135c and 135d are associated with and control operation of CTG generators 125c and 125d. Load controllers 140a-c are also associated with and control operation of loads 130a-c, similar to that described above with reference to load controller 40 and FIG. 1. Thus, each unit coordinator 135a and 135b is configured for coordinated boiler and turbine operation of a corresponding CFB/STG generator 125a and 135b at a desired power output level. The unit coordinators 135a and 135b receive input control parameters from the master system controller 145, and provide operating characteristics and other control signals or information for the respective generator 125a or 125b to the master system controller 145.

The CTG master controllers 135c and 135d function similarly to control the power output levels of the CTG generators 125c and 135d, respectively. (But as the CTG generators 125c and 125d do not have an equivalent boiler, the particular control scheme implemented by the CTG master controllers 135c and 135d may generally be different from that implemented by the unit coordinators 135a and 135b). Generator sensors 150a-d also measure one or more operating characteristics of the generators 125a-d, as described above, which can include instantaneous measurements of generator power output, supply voltage, supply current, power factor, and the like.

Load controllers 140a-c are associated, respectively, with the electric arc furnaces 130a and 130b and the ladle furnace 130c. As described above, load controllers 140a-c are configured to control a respective load for operation at a selected load set-point based upon one or more input control parameters received from the master system controller 145. Load controllers 140a-c are also configured to provide operating characteristic information for a respective load 130a-c to the master system controller 145. Load sensors 155a-c also monitor one or more operating characteristics of the loads 130a-c, also as described above.

Master system controller 145 is linked to each of the unit coordinators 135a and 135b, the CTG master controllers 135c and 135d, and the load controllers 140a-c for coordinating operation of the power system 120. The function performed by master system controller 145 is similar to that performed by master system controller 45 (FIG. 1) in terms of maintaining balance between generator power supply and load power consumption. However, master system controller 145 additionally is configured to distribute overall power generation among the generators 125a-d and overall power consumption among the loads 130a-c. Thus, master system controller 145 determines power output levels for each generator 125a-d individually, as well as an overall power output level for the generators 125a-d collectively. In this way, master system controller 145 also can apportion the overall power supply within the power system 120 between the generators 125a-d as desired. A similar function is performed concerning the loads 130a-c. The master system controller 145 can determine respective set-points for the loads 130a-c individually, as well as an overall set-point for the loads 130a-c collectively. Power consumption within the power system 120 can also be apportioned by the master system controller 145 as desired.

Specifically, the master system controller 145 is configured to generate input control parameters for the loads 130a and 130b corresponding to individually selected load power set-points, which can be equal or different, depending on the type of control applied. For example, the load 130a can be controlled for operation at a first power set-point (e.g. 40 MW) and the load 130b can be controlled simultaneously for operation at a second power set-point (e.g. 75 MW), different from the first power set-point. In some embodiments, the master system controller 145 is also configured to generate input control parameters for the loads 130a and 130b so that an overall load set-point is achieved (e.g. 115 MW), whether or not the loads 130a and 130b are operated at equal or different power set-points. For example, the master system controller 145 can implement a control scheme similar to those described in U.S. Pat. Nos. 7,212,561, 7,212,562 and 7,257,146, incorporated by reference above, to maintain overall power balance or phase angle across all loads connected to the system bus 132.

Analogously, the master system controller 145 is configured to generate input control parameters for the generators 125a-d, so that an overall power output within the system 120 is apportioned between the generators 125a-d according to respective individual power output levels. The sum of the individual power output levels for each generator 125a-d equals the overall power output of the generators 125a-d. The respective power output levels of the generators 125a-d can be equal or different, depending on how the master system controller 145 regulates the generators 125a-d. For example, generator 125a can be controlled to supply a first output power level based on a first output power demand provided by the master system controller 145, and generator 125b can be controlled to supply a second output power level based on a second output power demand provided by the master system controller 145, which is different from the first output power demand used as an input control parameter for controlling the generator 125a. The first and second output power demands can be calculated by the master system controller 145 to meet an overall power demand within the power system 120 (e.g., equal to the overall power draw of the loads 130a-c plus any house loads present in the power system 120). In some embodiments, however, the respective power demands provided as input control parameters to the generators 125a and 125b do not necessarily have to be equal, so long as the combined output of the generators 125a and 125b satisfied the overall power demand. This may result in unbalanced generator outputs.

As an example, if loads 130a and 130b were each drawing 44 MW, load 130c was drawing 10 MW, and assuming a 2 MW house load, total power demand within the power system 120 would equal 100 MW. Master system controller 145 can then request a 50 MW output from each of the generators 125a and 125b to meet the total demand. Unit coordinators 135a and 135b would then adjust the respective outputs of the generators 125a and 125b to match. Alternatively, the master system controller 145 can request unbalanced production from the generators 125a and 125b, such as 45 MW from generator 125a and 55 MW from generator 125b, which sum to the required 100 MW total output. In still other embodiments, master system controller 145 does not actively regulate the relative outputs of each generator 125a and 125b and instead only controls the combined power output of the two generators 125a and 125b. Unit coordinators 135a and 135b then compete with each other to satisfy the overall power demand, and the relative power outputs from each generator 125a and 125b are effectively decided by the dynamic performance characteristics of the unit coordinators 135a and 135b.

In some embodiments, generators 125c and 125d can also be activated and controlled by the master system controller 145 to provide secondary output power levels, in addition to the primary power outputs provided by generators 125a and 125b, so that the overall power demand of the loads 130a-c (plus any house loads) is satisfied. Again, the master system controller 145 can actively set unit power demands for each generator 125a-d to regulate respective output levels, or alternatively can regulate the generators 125a-d to meet an overall power demand, leaving the relative power outputs of the generators 125a-d determined by the dynamic performance of the unit coordinators 135a and 135b and the CTG master controllers 135c and 135d. The generators 125c and 125d, when activated, can be used by the master system controller 145 as fast-response generators within the system 120, configured to make up any power shortfall created by the two primary generators 125a and 125b during load transients, runback events, or for other reasons.

The types of input control parameters generated by the master system controller 145 are as described above, with reference to master system controller 45 shown in FIG. 1, but with the addition that individual as well as overall set-points and output levels may be specified. Thus, the master system controller 145 can determine individual unit, as well as overall, power output levels for the generators 125a-d. The master system controller 145 also determines individual, as well as overall, load power set-points for the loads 130a-c. Individual unit output capability limits for the generators 125a-d are also provided to the master system controller 145. Individual ramp rate limits and power set-point holds are also determined by the master system controller 145.

It should be appreciated that the power system 120 is illustrated in FIG. 2 in an exemplary form, only explicitly showing four generators 125a-d and three controlled electrical loads 130a-c. The power system 120 can be modified in different embodiments to include arbitrary numbers of power generators and/or loads.

Figure 3:
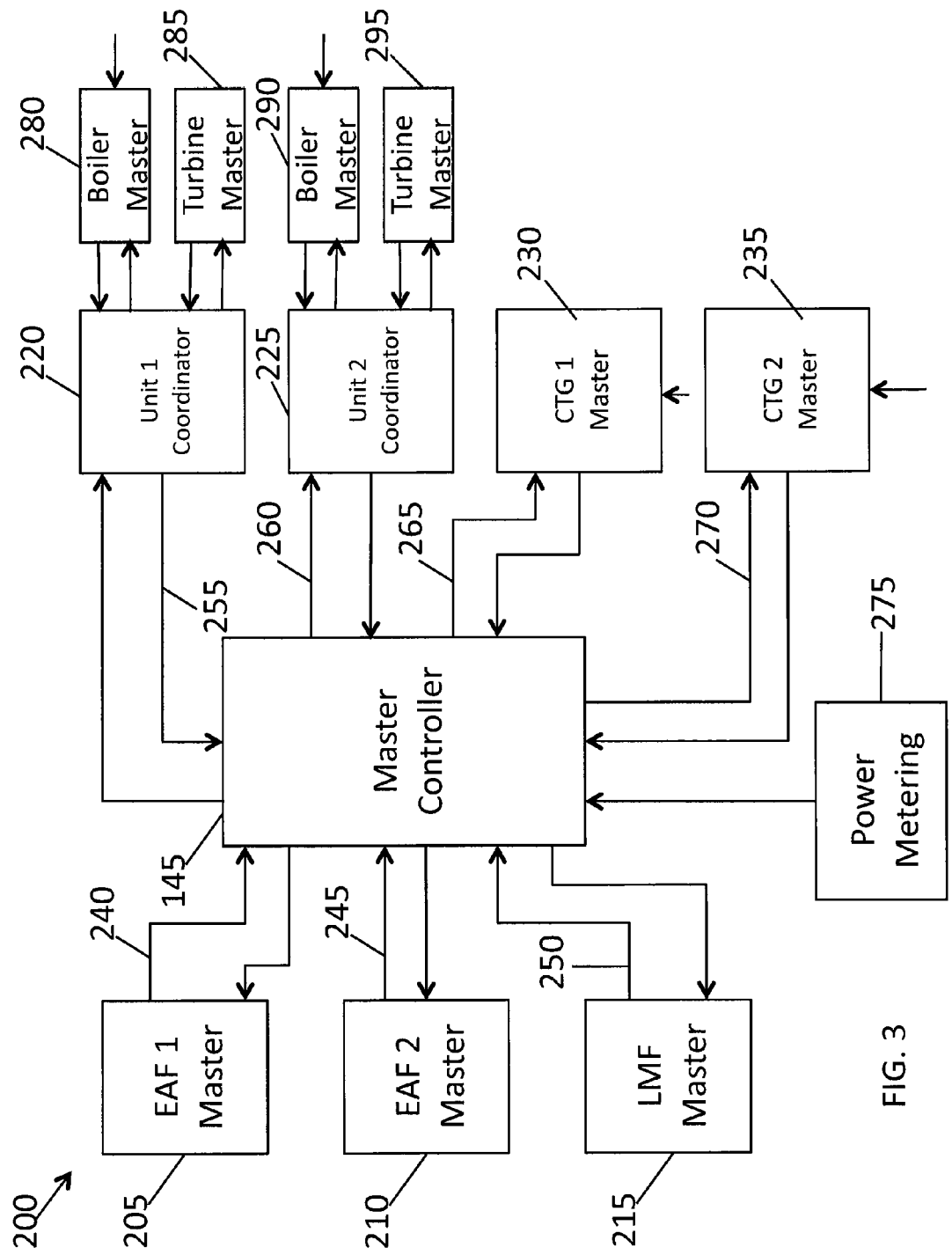
FIG. 3 illustrates, in a schematic diagram, an overview of a control system for the system shown in FIG. 3.

Reference is now made to FIG. 3, which illustrates a schematic diagram of an overview of a control system 200 for the power system 120, shown in FIG. 2. The control system 200 includes a first EAF master controller 205 and a second EAF master controller 210 for controlling the electric arc furnaces 130a and 130b, respectively, and an LMF master controller

215 for controlling the ladle furnace 130c. Each of the EAF master controllers 205 and 210 and the LMF master controller 215 are coupled to the master system controller 145, which controls each associated furnace in a coordinated, integrated fashion.

The control system 200 also includes first and second unit coordinators 220 and 225 for controlling the CFB/STG generators 125a and 125b, and first and second CTG master controllers 230 and 235 for controlling the CTG generators 125c and 125d, respectively. The master system controller 145 is also coupled to each of the first unit coordinator 220, second unit coordinator 225, first CTG master controller 230 and second CTG master controller 235, and controls each associated generator 125a-d in a coordinated, integrated fashion. Unit coordinator 220 also has an associated boiler master 280 and turbine master 285, and similarly unit coordinator 225 has an associated boiler master 290 and turbine master 295.

The master system controller 145 is coupled to EAF master controller 205 using data communication lines 240 by which master system controller 145 provides load control parameters to the EAF controller 205 and receives operating characteristics of the electric arc furnace 130a. The master system controller 145 is also coupled to EAF master controller 210 using data communication lines 245, by which master system controller 145 provides load control parameters to the EAF controller 210, and receives operating characteristics of the electric arc furnace 130b. In this example configuration of the control system 200, EAF controllers 205 and 210 are identical, although EAF controllers 205 and 210 can have different configurations relative to one another in alternative embodiments as well. Accordingly the following description of EAF controller 205 applies equally to both.

The operating characteristics of the electric arc furnace 130a are provided by EAF controller 205 based on operator input and include a power set-point (POW_SET_PNT) of the electric arc furnace 130a. An electrode slip initiated (ELEC_SLP_INIT) control parameter is also provided to the master system controller 145 by the EAF controller 205. The input control parameters for the EAF controller 205 are generated by the master system controller 145 based on operating characteristics of the generators 125a-d, and include: a system capability limit (SYS_CAP_LIM), a positive ramp rate limit (POS_RAMP_LIM), a negative ramp rate limit (NEG_RAMP_LIM), a block increase (BLK_INC), a block decrease (BLK_DEC), and an electrode slip permissive (ELEC_SLP_PER) control parameter. The second EAF controller 210 is coupled to the master system controller 145 by data communication lines 245 used to transfer the same load control parameters and operating characteristics as data communication lines 240, but calculated for the electric arc furnace 130b associated with second EAF controller 210.

The POW_SET_POINT operating characteristic represents the regulated power level of each respective EAF, and can be defined in terms of one or more of complex power, real power, reactive power, and power angle. An external operator of the control system 200 can select and input a target power level to be used as the power set-point of the associated EAF. However, as will be explained in more detail below, generator runback control can be implemented in the generators 125a-d to override the selected target power level and impose an effective system capability on the EAF power set-point, thereby ensuring that load demand does not exceed available power generation capacity. Moreover, the ELEC_SLP_INIT control parameter is a Boolean variable indicating whether an electrode slip or electrode replacement operation is requested for electric arc furnace 130a. Together with the ELEC_SLP_PER control parameter, the master system controller 145 uses ELEC_SLP_INIT to initiate a communication protocol between a given CFB/STG generator 125a or 125b and a given electric arc furnace 130a or 130b for facilitating the required electrode operation.

In terms of load control parameters for the EAF controller 205, the SYS_CAP_LIM parameter represents an operational upper limit on the power set point of the electric arc furnace 130a, determined based on available power generation capability and taking into account the instantaneous power draws of other loads present in the power system 120, including house loads potentially. The POS_RAMP_LIM and NEG_RAMP_LIM parameters represent respective limits on the rate at which the power set-point of the EAF 130a can be increased or decreased. These ramp limits can be defined with respect to, and may typically equal, corresponding ramp limits imposed on the CFB/STG generators 125a and 125b. The BLK_INC control parameter is a Boolean variable indicating whether it is permitted to continuing ramping up the power set-point of the electric arc furnace 130a. Similarly the BLK_DEC control parameter is a Boolean variable indicating whether continued ramping down of the power set-point is permitted. Finally, the ELEC_SLP_PER parameter is a Boolean variable, used in conjunction with ELEC_SLP_INIT, to coordinate electrode slip and replacement operations.

The LMF controller 215 is coupled to the master system controller 145 using data communication lines 250, by which master system controller 145 provides input control parameters to the LMF controller 215 and receives operating characteristics of the ladle furnace 130c. The operating characteristics of the ladle furnace 130c are provided by LMF controller 215 based on operator input and include a power set point (POW_SET_PNT) of the ladle furnace 130c. The POW_SET_PNT operating characteristic represents a target power level of the ladle furnace 130c, which again can be defined in terms of one or more of complex power, real power, reactive power, and power angle. An external operator can select the target power level for the ladle furnace 130c. Optionally, a ladle operation initiated (LAD_OP_INIT) control parameter can be utilized as well, similar to the ELEC_SLP_INIT control parameter, to initiate a communication protocol for coordinating switch on of the ladle furnace 130c. However, in some embodiments, if the relative power draw of the ladle furnace 130c is small compared to the available capacity of the generators 125a-d, then the LAD_OP_INIT parameter may be omitted. In such cases, the ladle furnace 130c may be switched on unannounced without significant negative impact on the overall stability of the system 120.

The load control parameters for the LMF controller 215 are generated by the master system controller 145 based on operating characteristics of the generators 125a-d, and include: a block increase (BLK_INC) and a block decrease (BLK_DEC) control parameter. Optionally, a ladle operation permissive (LAD_OP_PER) parameter corresponding to the LAD_OP_INIT control parameter may be utilized as well. The block increase and block decrease control parameters are Boolean variables used to block increase and/or decrease of the ladle furnace set-point, if necessary. As the instantaneous power draw of the ladle furnace 130c is typically small by comparison to the power draw of the electric arc furnaces 130a and 130b, the BLK_INC and BLK_DEC parameters for the LMF furnace 130c can sometimes be excluded. For the same reason, limits on the power set-point, as well as positive/negative ramp rates, for the ladle furnace 130c may also be excluded from the control system 200 in some cases. However, optionally, in some embodiment, the LMF controller 215 is further configured to receive one or more of a system capability limit, positive ramp rate limit and negative ramp rate limit control parameter, substantially as described above in respect of the EAF controllers 205 and 210.

The master system controller 145 is also coupled to unit coordinator 220 and unit coordinator 225, respectively, using data communication lines 255 and 260, by which the master system controller 145 can exchange load control parameters and operating characteristic information with the unit coordinators 220 and 225.

As operating characteristics of the two CFB/STG generators 125a and 125b, unit coordinators 220 and 225 provide a power output capability (POW_OUT_CAP), a positive ramp rate limit (POS_RAMP_LIM) and a negative ramp rate limit (NEG_RAMP_LIM), as well as a block increase (BLK_INC), a block decrease (BLK_DEC) and an electrode slip permissive (ELEC_SLP_PER) control parameter. The power output capability control parameter represents an effective limit on the power output capability of the respective CFB/STG generator 125a or 125b during operation, and can vary depending on the present operating state of the CFB/STG generator 125a or 125b, including whether different generator safety equipment is fully functional. The other operating characteristics of the CFB/STG generators 125a or 125b are as described above in the context of the electric arc furnaces 130a and 130b.

Load control parameters for the unit coordinators 220 and 225 are provided by the master system controller 145 and generated based on operating characteristics of the two electric arc furnaces 130a and 130b, and the ladle furnace 130c, and include a unit power demand (POW_DMD) control parameter. An electrode slip initiated (ELEC_SLP_INIT) control parameter is also provided. Optionally, a ladle operation request (LAD_OP_INIT) control parameter can also be provided though in some cases this can be excluded. The POW_DMD demand control parameter represents a target power output level for a respective CFB/STG generator 125a or 125b, determined by the master system controller 145, so that the overall power output from the generators 125a-d is adequate to meet the total power demand of all the operational loads within the power system 120.

The master system controller 145 is also coupled to CTG master controller 230 and CTG master controller 235, respectively, using data communication lines 265 and 270. Using data communication lines 265 and 270, the master system controller 145 can exchange input control parameters and operating characteristics with the CTG master controllers 220 and 225. The master system controller 145 receives a power output capability (POW_OUT_CAP), a positive ramp rate limit (POS_RAMP_LIM), and a negative ramp rate limit (NEG_RAMP_LIM), for each CTG master controller 230 and 235, as operating characteristics of the two CTG generators 125c and 125d. A block increase (BLK_INC) and block decrease (BLK_DEC) operating characteristic are also provided to the master system controller 145. Also, the master system controller 145 generates a unit power demand (POW_DMD), as a generator input control parameter, for each CTG master controller 230 and 235. The POW_DMD control parameter is generated based on operating characteristics of the two electric arc furnaces 130a and 130b and the ladle furnace 130c and represents, for each CTG generator 125c and 125d, a respective target power output level.

Power metering module 275 monitors each controlled load and generator included in the power system 120, and provides instantaneous power measurements to the master system controller 145. For example, power metering module 275 measures a power draw for each electric arc furnace 130a and 130b (EAF_POW_DRW) and for the ladle furnace 130c (LMF_POW_DRW). Power metering module 275 also measures a power supply output from each CFB/STG generator 125a and 125b (UNIT_POW_OUT) and from each CTG generator 130c and 130d (CTG_POW_OUT). The power measurements generated by power metering module 275 can be taken at an appropriate sampling interval, as will be apparent. Thus, power metering module 275 can represent generator sensors 150a-d and load sensors 155a-c in the control system 200. It should be appreciated, however, that other operating characteristics could be monitored, and other functions including filtering and signal processing functions can be incorporated into the power metering module 275.

Figure 4:
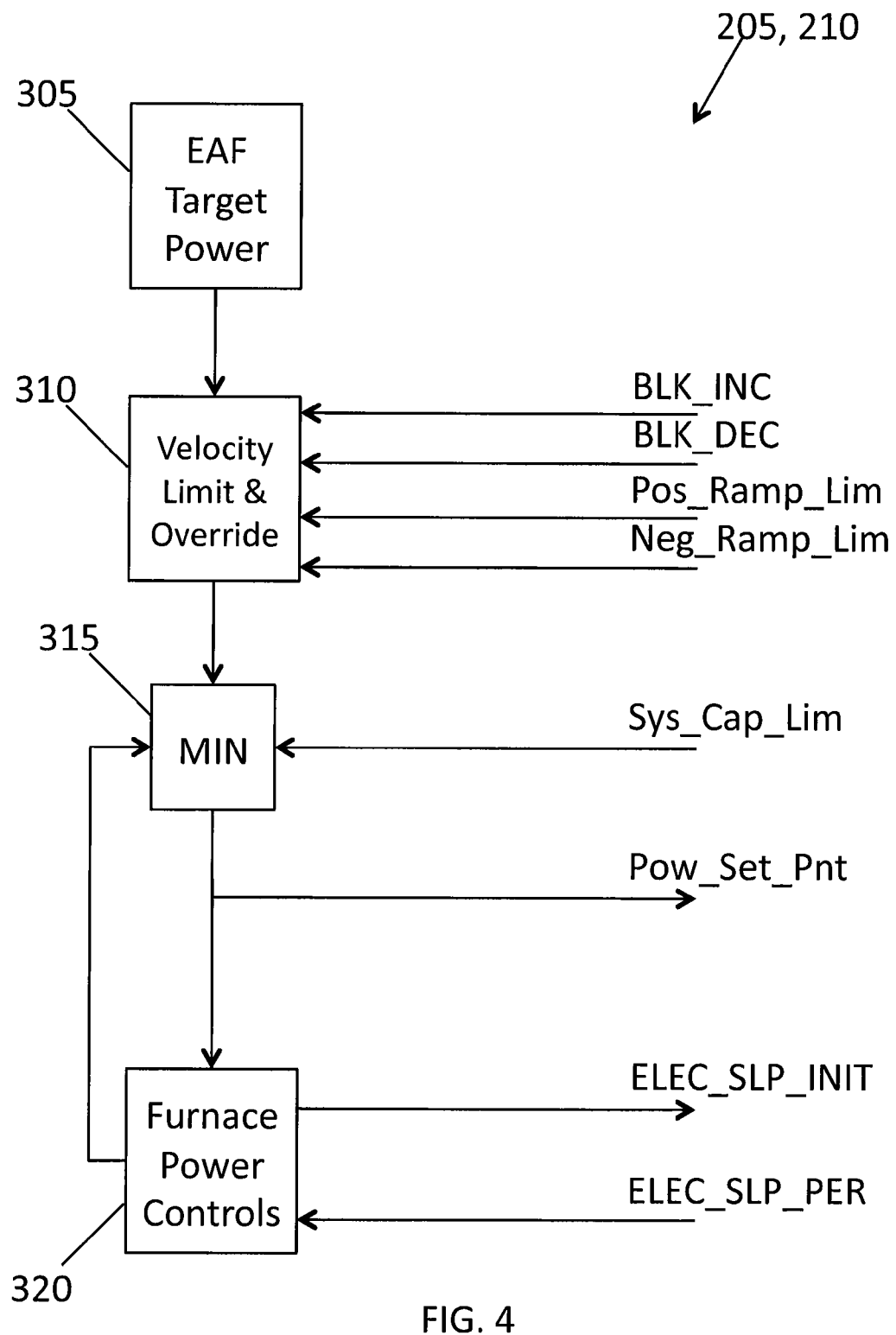
FIG. 4 illustrates, in a schematic diagram, the electric arc furnace controllers, shown in FIG. 3, in more detail.

Reference is now made to FIG. 4, which illustrates a schematic diagram of the EAF controller 205 or EAF controller 210, shown in FIG. 3, in more detail. Each EAF controller 205 and 210 can have the configuration shown in FIG. 3. For ease of description, reference will at times be made primarily to EAF controller 205.

Target EAF power levels for the electric arc furnaces 130a and 130b are selected, for example, by an operator using the set-point input interface 305. The specified target EAF power is then passed into rate limit and override module 310, which adjusts the target EAF power based upon different control parameters input to the EAF controller 205. As seen in FIG. 3, the block increase, block decrease, positive ramp rate limit and negative ramp rate limit control parameters are passed into the rate limit and override module 310. In normal steady-state operation of the power system 120, the output of the rate limit and control module 310 will settle at the EAF target power specified using the set-point input interface 305. However, during a set-point change or other load event, the rate limit and control module 310 can be used to affect the transient performance of the EAF controller 205 in adjusting the load set-point, which helps to maintain power stability within the control system 200, as follows.

When a set-point increase is requested, the rate limit and override 310 will impose the positive ramp rate limit (whatever value has been set according to the POS_RAMP_LIM control parameter) on the EAF target power, so that the instantaneous power draw of the electric arc furnace 130a undergoes a controlled increase. As mentioned, the positive ramp rate limit can generally be defined in relation to the ramp rate limits of the generators 125a-d to ensure that the increase in load demand can be matched by corresponding generator output. Assuming the block increase control parameter has not been asserted, when the EAF target power is increased, the EAF power set-point (i.e., the value ultimately passed to the furnace power controls 320, as contrasted with the EAF target power requested using the set-point input interface 305) will ramp up at the prescribed rate limit under the control of the rate limit and override module 310. However, if during a power ramp up, the block increase control parameter is asserted, then rate limit and override module 310 will suspend power ramp up and hold the EAF power set-point at its present level until the block increase control parameter is released. After that point ramping continues until the EAF power set-point reaches its target, steady-state level.

The operation of rate limit and control module 310 is the same when a set-point decrease is requested. The rate limit and override 310 will impose the negative ramp rate limit (according to whatever value has been set for the NEG_RAMP_LIM control parameter) on the EAF target power so that the instantaneous power draw of the electric arc furnace 130a undergoes a controlled decrease during set-point changes. The negative ramp rate limit may generally be different from the positive ramp rate limit. Assuming the block decrease control parameter has not been raised, when the EAF target power is decreased, the rate limit and override module 310 will lower the power set-point of the EAF according to the prescribed rate limit until the EAF power set-point reaches its target, steady-state level. Again, if during a power ramp down, the block decrease control parameter is asserted, then rate limit and override module 310 will suspend power ramp down and hold the EAF power set-point at its present level until the block increase control parameter is released and ramping is permitted to continue. As will now be discussed further, however, system capability limits and load faults can also each constrain the value of the EAF power set-point.

The output of the rate limit and control module 310 is passed into comparison block 315, wherein it is compared against the system capability limit (SYS_CAP_LIM) control parameter and a fault override signal provided by furnace power controls 320. The comparison block 315 selects the lesser of these three values as the EAF POW_SET_PNT operating characteristic. If the generators 125a-d are functioning properly, the system capability limit may generally be large enough to accommodate the EAF target power and, thus, no effective limit on the EAF target power will be imposed by the comparison block 315. However, in the event of a generator run back or equipment malfunction, the total generating capability of the power system 120 may suddenly drop, causing the SYS_CAP_LIM control parameter to drop below the EAF target power. In such a case, the comparison block 315 will then limit the EAF target power to the system capability limit. Thus, the SYS_CAP_LIM control parameter provides feedback from the generators 125a-d relating to the total power generation capability within the power system 120.

The output of the comparison block 315 is provided to the furnace power controls 320, which generates control values for the electric arc furnace 130a or 130b to achieve the desired power set-point for that electric arc furnace 130a or 130b (whether that set-point is equal to the operator-selected target power, or has been limited based on the system capability control limit). For example, if variable reactor control is utilized to control the electric arc furnace 130a or 130b, then furnace power controls 320 calculates thyristor firing angles for the variable reactor required to achieve the EAF power set-point. Furnace power controls 320 can also be configured to calculate feed rates, electrode heights and other control values as described in U.S. Pat. Nos. 6,603,795, 7,212,561, 7,212,562 and 7,257,146, for regulating the electric arc furnace 130a or 130b at the power set-point.

Comparison block 315 is coupled to the furnace power controls 320 in feedback configuration for receiving the fault override signal generated by the furnace power controls 320. During operation of the control system 200, the furnace power controls 320 also monitors the electric arc furnace 130a or 130b in order to detect electrical faults at the load or other events, such as unplanned load switch-off, which result in complete or partial load rejection. If such load rejection occurs, the actual power draw of the electric arc furnace 130a or 130b can drop sharply, sometimes even to zero, leaving a large power surplus at the generators 125a-d and overall unbalance within the power system 120. To reduce the response time of the generators 125a-d in cutting output to match the new demand, the fault override signal is provided to the comparison block 315. In the event of load rejection, the fault override signal overrides the target EAF target power and limits the value of POW_SET_PNT control parameter to the actual power draw of the electric arc furnace 130a or 130b, which triggers an immediate response from the CFB/STG generators 125a and 125b (or CTG generators 125c and 125d) to reduce output. If necessary, turbine generator bypass systems can be activated for this purpose.

Furnace power controls 320 is also configured to generate the electrode slip initiated control parameter, and to receive the electrode slip permissive control parameter, for coordinating electrode slip or replacement at both the generator and load side. When electrode slip or replacement is requested, the electrode slip initiated control parameter can be asserted, at which point the furnace power controls 320 waits for confirmation, by way of the electrode slip permissive control parameter, that the CFB/STG generators 125a and/or 125b have been pre-configured for electrode event so that the requested action can be taken. Once permission is given by a responding CFB/STG generator 125a or 125b, the furnace power controls 320 can initiate an electrode slip on the electric arc furnace 130a or 130b, resulting in immediate load rejection, until the slip or replacement is completed and the load can be brought back online. As described above, furnace power controls 320 also monitors the state of the electric arc furnace 130a or 130b during the slip/replacement process, and provides feedback to the CFB/STG generators 125a or 125b by setting the value of the fault override signal (used, if necessary, to limit the EAF power set-point) output to the master system controller 145.

Figure 5:
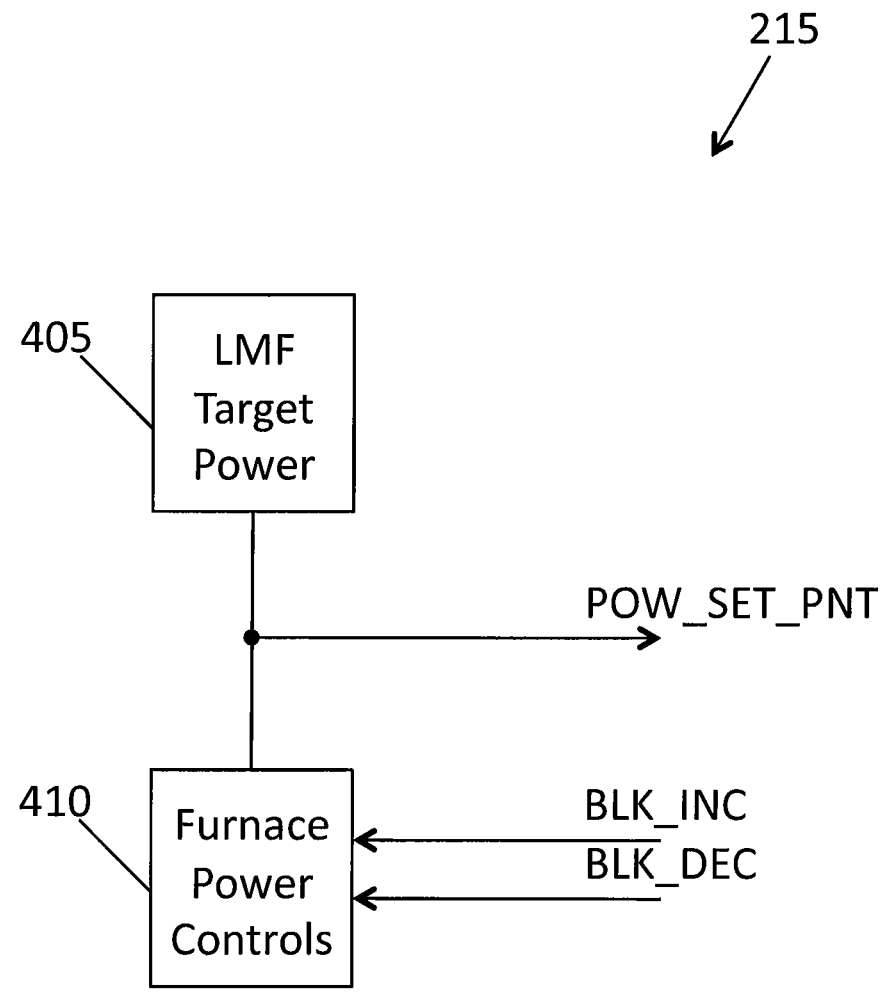
FIG. 5 illustrates, in a schematic diagram, the ladle furnace controller, shown in FIG. 3, in more detail.

Reference is now made to FIG. 5, which illustrates a schematic diagram of the LMF controller 215, shown in FIG. 3, in more detail. A target power level for the ladle furnace 130c is selected, for example, by an operator using the set-point input interface 405, and is provided to the LMF power controls 410. The target power level selected using the set-point input interface 405 is also output to the master system controller 145 as the LMF POW_SET_PNT operating characteristic. The LMF power controls 410 generates control values for the ladle furnace 130c to achieve the desired power set-point based on various control parameters, as shown, including the block increase (BLK_INC) and block decrease (BLK_DEC) control parameters. As mentioned, because the power draw of the ladle furnace 130c may generally be low, intermittent operation of the ladle furnace 130c tends not to impact too negatively on the overall stability of the power system 120. Some control utilized in association with the electric arc furnaces 130a and 130b can be excluded from the LMF controller 215. As shown, block increase and block decrease control parameters are provided to the furnace power controls 410 to prevent increases and decreases in the LMF power set-point, respectively. Ramp rate and system capability limits are excluded from the LMF controller 215 in at least some embodiments. Accordingly, the LMF target power selected using the set-point input interface 405 is provided directly to the master system controller 145 as the power set-point for the ladle furnace 130c. However, in some embodiments, positive and/or negative ramp rate limits for the ladle furnace 130c can also be generated by the master system controller 145 and provided to the LMF controller 215 as input control parameters. As with the corresponding positive and negative ramp rate limits for the electric arc furnaces 130a and 130b, positive and/or negative ramp rate limits received by the LMF controller 215 can be used for controlled (e.g., constant) ramping up or down of the LMF power set-point provided to the furnace power controls 410.

Figure 6A:
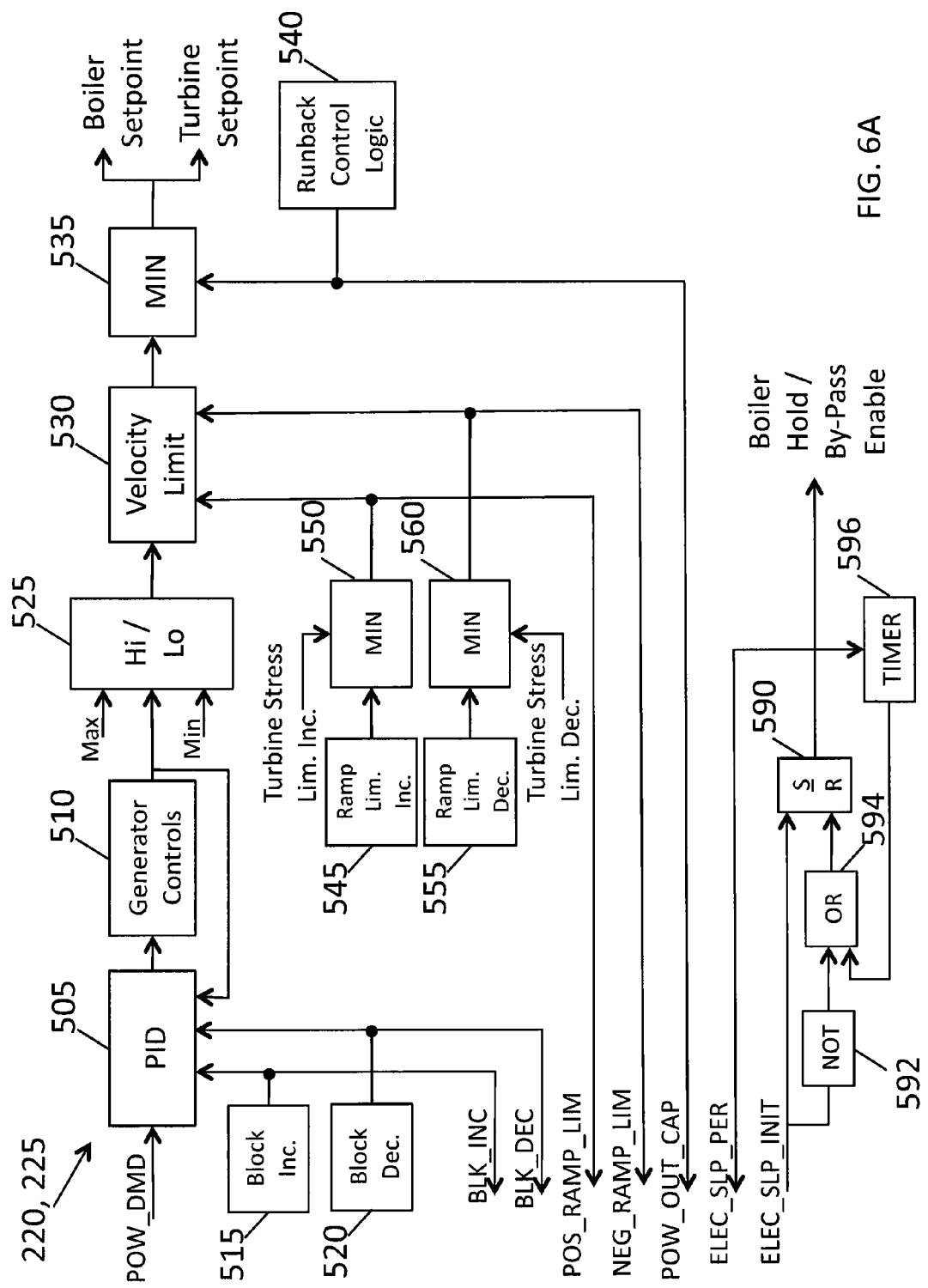
FIG. 6A illustrates, in a schematic diagram, the unit coordinators, shown in FIG. 3, in more detail.

Reference is now made to FIG. 6A, which illustrates a schematic diagram of a portion of the unit coordinator 220 or the unit coordinator 225, shown in FIG. 3, in more detail. It should be noted that, although unit coordinator 220 and unit coordinator 225 are shown equivalently in FIG. 6A, these components may have different configurations in alternative embodiments. For ease of description, reference will at times be made primarily to unit coordinator 220.

The power demand (POW_DMD) control parameter for CFB/STG generator 125a or 125b is received into the feedback controller 505, which can be a PID type controller, for example. The POW_DMD control parameter is used by the generator power controls 510, in conjunction with the feedback controller 505, to regulate the power output of the CFB/STG generator 125a or 125b to match demand within the power system 120. As will be appreciated, the feedback controller 505 is coupled to the input of the generator power controls 510, and provides control values used by the generator power controls 510 to achieve the desired power output of the CFB/STG generator 125a or 125b. Turbine-level frequency control can also be performed simultaneously at the CFB/STG generator 125a or 125b.

Block increase control 515 and block decrease control 520 also provide override signals to the feedback controller 505, which, if asserted, suspend power output regulation in the feedback controller 505 until released. Thus, if the block increase control 515 asserts the block increase control parameter during ramping up of the CFB/STG generator 125a or 125b, the feedback controller 505 will hold the power output of the CFB/STG generator 125a or 125b at its present level until the block increase control parameter is released. Similarly, if the block decrease control 520 asserts the block decrease control parameter during ramping down of the CFB/STG generator 125a or 125b, the feedback controller 505 will hold the CFB/STG generator 125a or 125b at its present power output until the block decrease control parameter is released. The block increase and block decrease (BLK_INC, BLK_DEC) control parameters are also provided to the master system controller 145 to be used for controlling the electric arc furnaces 130a and 130b.

The regulated power output level of the CFB/STG generator 125a or 125b (i.e., the output of the generator power controls 510) is passed sequentially to the HI/LO limiter 525, rate limiter 530 and comparison block 535. HI/LO limiter 525 is used to ensure that the output of the CFB/STG generator 125a or 125b remains within a safe operating range defined by a minimum and maximum permissible power output, respectively. The range limited power output level of the CFB/STG generator 125a or 125b is then subjected to positive and negative ramp rate limits in the rate limiter 530, which operates similar to rate limit and override 310 shown in FIG. 4. Comparison block 535 then limits the power output level of the CFB/STG generator 125a or 125b according to the power output capability (POW_OUT_CAP) of the CFB/STG generator 125a or 125b, which is provided to comparison block 535 by runback control 540. As will be appreciated, runback control 540 monitors the condition of different equipment or safety systems installed in the CFB/STG generator 125a or 125b and, in the event of failure, will override and reduce the target output power level of the CFB/STG generator 125a or 125b as appropriate. The output of comparison block 535 is provided to boiler master 280 or 290 and to turbine master 285 or 295 (FIG. 3) to determine boiler and turbine set-points, respectively. The POW_OUT_CAP operating characteristic is also provided to the master system controller 145.

Positive ramp rate limit input interface 545 is used to set a user-defined limit on the rate at which the power output of the CFB/STG generator 125a or 125b can be ramped up. The user-defined limit is passed into comparison block 550, wherein it is compared against a turbine increase stress limit, and the lesser of these two values is passed to the rate limiter 530 for application to the target power output level. Similarly, negative ramp rate limit input interface 555 is used to set a user-defined limit on the rate at which the power output of the CFB/STG generator 125a or 125b can be ramped down. Comparison block 560 select the lesser of the user-defined limit and a turbine decrease stress limit (analogous to the turbine increase stress limit), which is then passed to the rate limiter 530. The outputs of the comparison blocks 550 and 560 are also outputted to the master system controller 145 as the positive ramp rate limit (POS_RAMP_LIM) and the negative ramp rate limit (NEG_RAMP_LIM) operating characteristics, respectively.

Figure 6B:
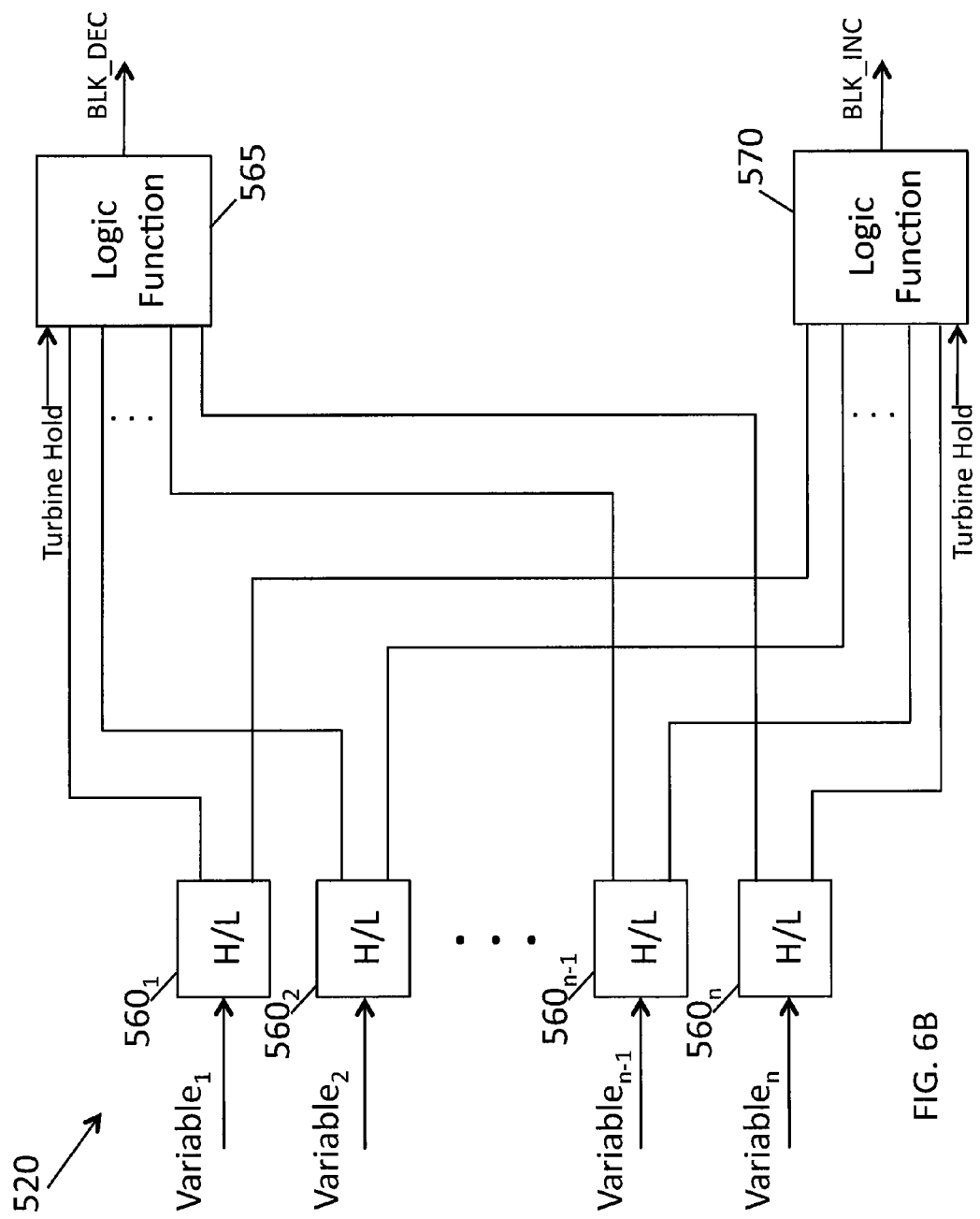
FIG. 6B illustrates, in a schematic diagram, the block increase and block decrease controls, shown in FIG. 6A, in more detail.

Reference is now made to FIG. 6B, which illustrates a schematic diagram of the block increase and block decrease controls 515 and 520 shown in FIG. 6A in greater detail. A plurality of range monitors $560_{1-n}$ is arranged in parallel, each different range monitor configured to receive a corresponding monitored process variable$_{1-n}$. Based on the value of the monitored process variables, the block increase and block decrease controls 515 and 520 determine whether to impose ramp holds on the CFB/STG generators 125a and 125b. The monitored process variables are not limited and can include, for example, a pressure error, a generator set-point error, a fuel flow control error, an air flow control, an FW flow control error, a pressure control error, a frequency error, a turbine load limit, and others. For each monitored variable, a corresponding ramp increase or ramp decrease hold can be imposed when that monitored variable exceeds a defined operating range.

Logic function 565 receives inputs from each range monitor $560_{1-n}$ corresponding to process variable deviations that potentially would require a power generation down ramp to be suspended. For example, if the drum level on one of the generator boilers is too high, a block decrease may be imposed to avoid generator tripping. The logic function 565 can be any logic function used to determine when a block decrease should be imposed. In an example case, the logic function 565 can be a simple OR function. It will be apparent, however, that more complex logic functions can be implemented in alternative embodiments. Logic function 565 can also be provided with a manual turbine hold override, if desired, which can result in a block decrease being imposed regardless of the state of the monitored process variables.

Logic function 570 receives a different input from each range monitor $560_{1-n}$, corresponding to process variable deviations that potentially would require a power generation ramp up to be suspended. Otherwise logic function 570 is similar to logic function 565 and can be a simple OR function, in an example case, or some other more complex logic function. Logic function 570 can also be provided with a manual turbine hold override, if desired, which can result in a block increase being imposed regardless of the state of the monitored process variables.

Figure 6C:
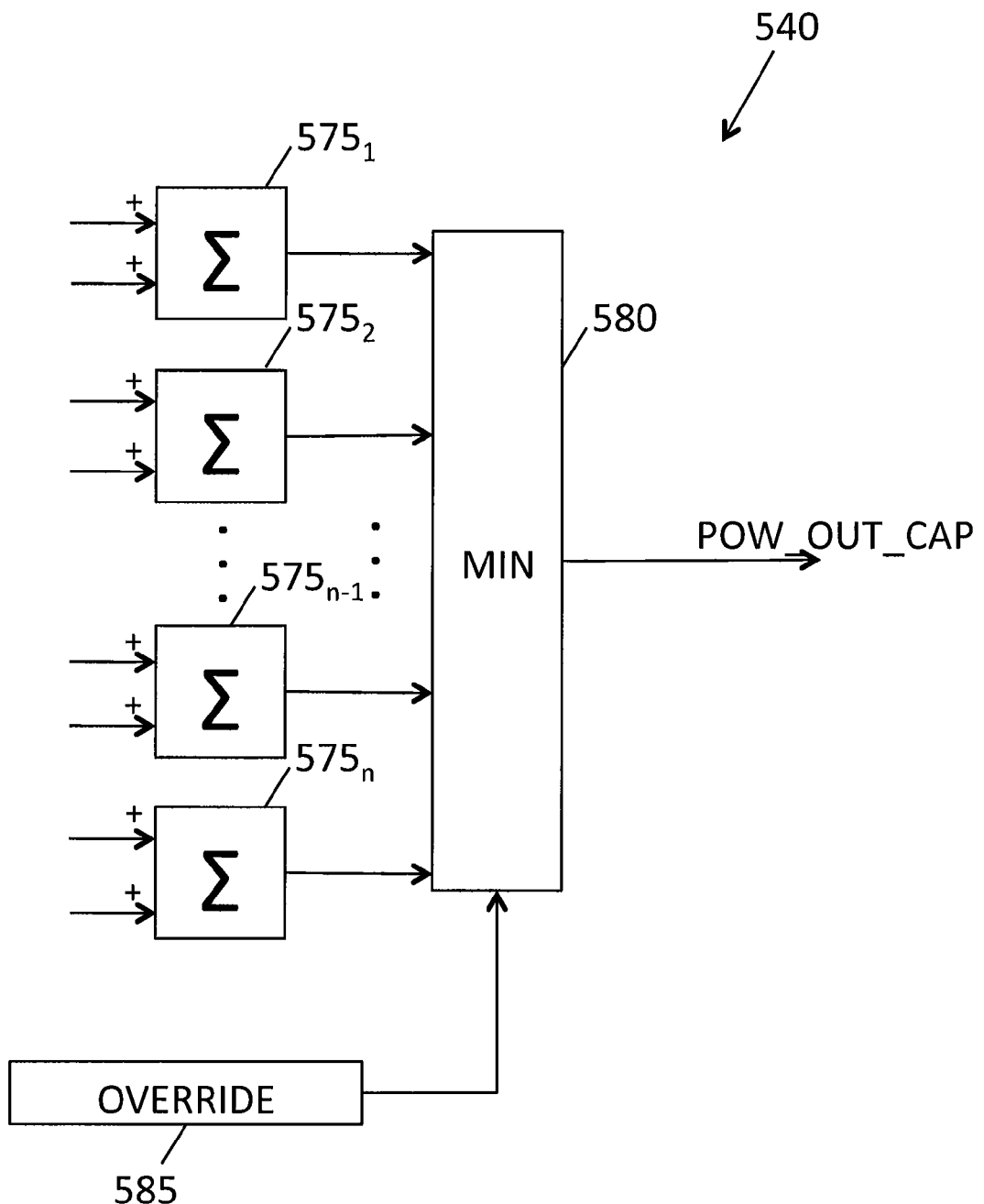
FIG. 6C illustrates, in a schematic diagram, the runback control module, shown in FIG. 6A, in more detail.

Reference is now made to FIG. 6C, which illustrates a schematic diagram of the runback control 540 shown in FIG. 6A in greater detail. A plurality of capacity calculators $575_{1-n}$ is arranged in parallel, each capacity calculator corresponding to a different piece of equipment or safety system installed in the CFB/STG generators 125a and 125b, which can include can include FBHE blowers, EH blowers, SA fans, ID fans, and PA fans. By monitoring the condition of each piece of equipment or safety system, the capacity calculators $575_{1-n}$ calculate an output power capability limit for the CFB/STG generators 125a and 125b.

For example, capacity calculator $575_1$ can be configured to calculate the output power capability of the CFB/STG generator 125a or 125b based on whether each of the unit's two SA fans are functioning properly. If it is determined that one of the two SA fans has failed, then the output power capability of the CFB/STG generator 125a or 125b can be reduced by half (to indicate that one of two fans was lost). Each capacity calculator $575_{1-n}$ determines an effective generation capability limit based upon a different safety system. Comparison block 580 selects the lowest such capability limit to be used as the POW_OUT_CAP operating characteristic. Override module 585 can also be used to set a user-defined output power capability.

Referring back to FIG. 6A, the electrode slip initiated (ELEC_SLIP_INIT) control parameter is received into the set node of set/reset (S/R) latch 590. The output of the S/R latch 590 is the electrode slip permissive (ELEC_SLP_PER) control parameter corresponding to the CFB/STG generator 125a or 125b, and also serves as a boiler hold control signal used to hold the generator boiler at its present level during electrode slip or replacement. The electrode slip initiated control parameter is also inverted using NOT gate 592 and then provided to one input terminal of OR gate 594. The output of the OR gate 594 is provided to the reset node of S/R latch 590. A second input terminal of the OR gate 594 receives a timer signal generated by the timer 596. As will be explained more below, the timer signal is used to limit the time available for performing electrode slip or replacement.

The control logic executed by the unit coordinator 220 or 225 during electrode slip or replacement is as follows. When the ELEC_SLP_INIT control parameter is asserted (indicating that electrode slip or replacement has been initiated by one of the electric arc furnaces 130a or 130b), the output of the S/R latch 590 is driven high. This causes the ELEC_SLP_PER control parameter to be asserted as well, which is routed back by the master system controller 145 to whichever electric arc furnace 130a or 130b initiated the slip or replacement operation, indicating that permission has been granted by one of the CFB/STG generators 125a or 125b. The output of the S/R latch 590 is also used as a boiler hold signal to place a temporary hold on the generator's boiler capacity, and as a by-pass system enable signal to pre-configure the generator's high-pressure by-pass system for responding to load rejection.

When the S/R latch 590 output is driven high, timer 596 is also triggered so that the output of the S/R latch 590 is fed back into the OR gate 594 after a pre-determined time limit. At the end the pre-determined time limit, the reset terminal of the S/R latch 590 is driven high and the ELEC_SLP_PER control parameter is released. If the slip or replacement operation is completed or aborted before expiration of the pre-determined time limit, the ELEC_SLP_INT control parameter is lowered, also causing the reset node of the S/R latch 590 to be driven high (because the output of the NOT gate 592 is driven high). As a result, the ELEC_SLP_PER control parameter is released, the boiler hold is released and the timer 596 is reset.

Figure 7:
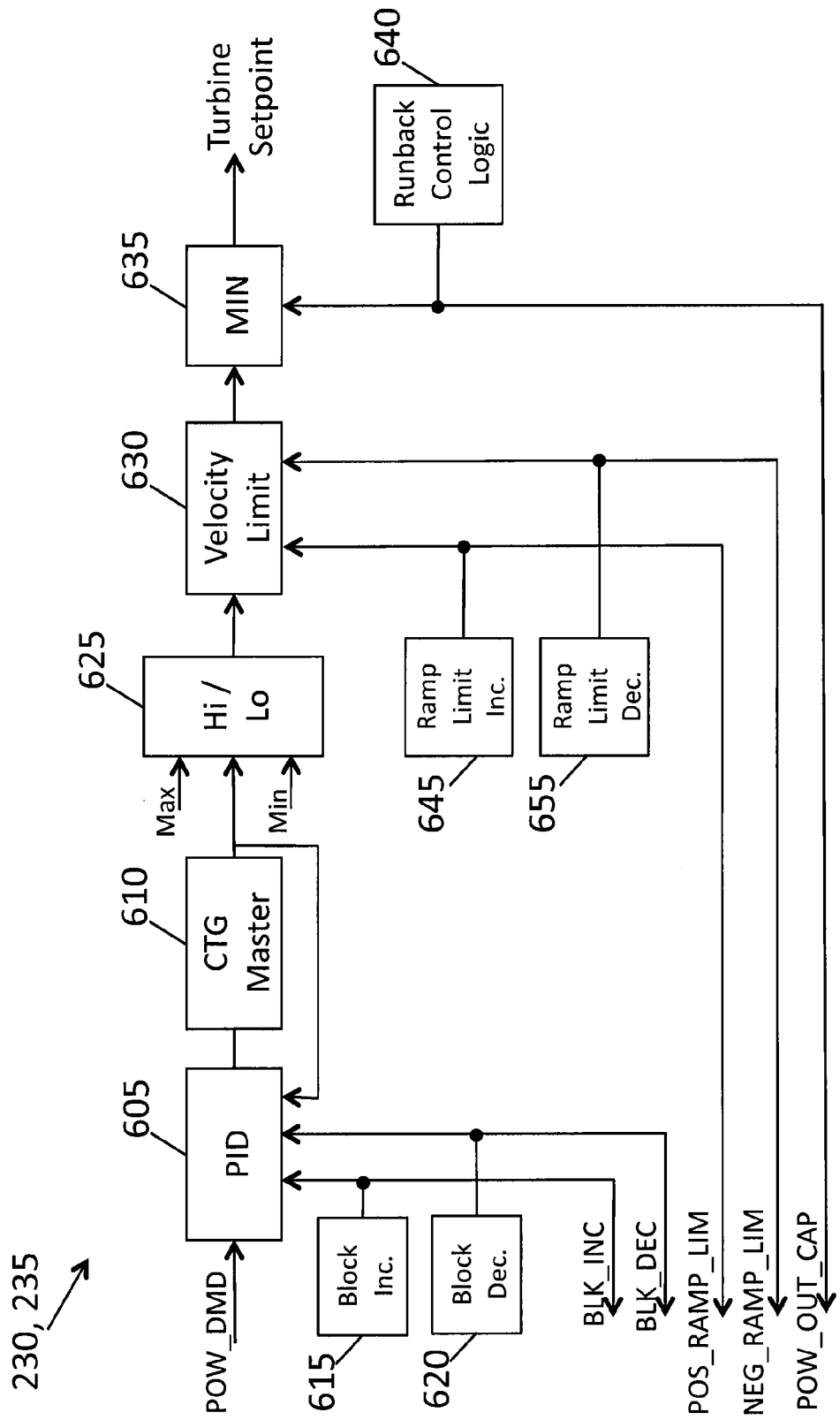
FIG. 7 illustrates, in a schematic diagram, the CTG master controllers, shown in FIG. 3, in more detail.

Reference is now made to FIG. 7, which illustrates a schematic diagram of the CTG master controller 230 or 235 shown in FIG. 3 in more detail. It should be noted that, although CTG master controller 230 and CTG master controller 235 are depicted identically in FIG. 7, in some alternative embodiments, the CTG master controllers 230 and 235 may be different. For ease of description, reference will at times be made primarily to CTG master controller 230. Also, as portions of the CTG master controllers 230 and 235 are similar to portions of the unit coordinators 220 and 225, some of the following description may be abbreviated for convenience.

The power demand (POW_DMD) control parameter for the CTG generator 125c or 125d is received into the feedback controller 605, which can again be any suitable PID controller, wherein the POW_DMD control parameter is used to regulate the power output of the CTG generator 125c or 125d. The feedback controller 605 is coupled to the input of the CTG master controls 610 and provides control values used by the CTG master controls 610 to achieve the desired the power output of the CTG generator 125c or 125d. The block increase control 615 and block decrease control 620 also provide an override signals (i.e., BLK_INC and BLK_DEC) to the feedback controller 605 to prevent increases and decreases in the power output of the CTG generator 125c or 125d. The block increase (BLK_INC) and block decrease (BLK_DEC) control parameters are also outputted to the master system controller 145.

The regulated power output of the CTG generator 125c or 125d (i.e., the output of the CTG master controls 610) is passed sequentially to the HI/LO limiter 625, rate limiter 630 and comparison block 635, which function substantially as described above. Thus, HI/LO limiter 625 restricts the regulated power output of the CTG generator 125c or 125d to within a safe operating range. Rate limiter 630 imposes positive and negative ramp rate limits, as determined by positive ramp rate limit input interface 645 and negative ramp rate limit input interface 655, respectively. Finally, comparison block 635 limits the output power level of the CTG generator 125c or 125d according to the power output capability (POW_OUT_CAP) of the CTG generator 125c or 125d, as determined by runback control 640. The positive ramp rate limit (POS_RAMP_LIM), negative ramp rate limit (NEG_RAMP_LIM) and power output capability (POW_OUT_CAP) operating characteristics are each also provided to the master system controller 145.

Reference is now made to FIGS. 8A-8F, which illustrate schematic diagrams of different portions of the master system controller 145, shown in FIG. 3, in more detail. For clarity of description only, the different aspects of the master system controller 145 will be addressed under different headings. However, use of headings should not be considered to limit the described embodiments in any way.

Generator Output Power Levels

Figure 8A:
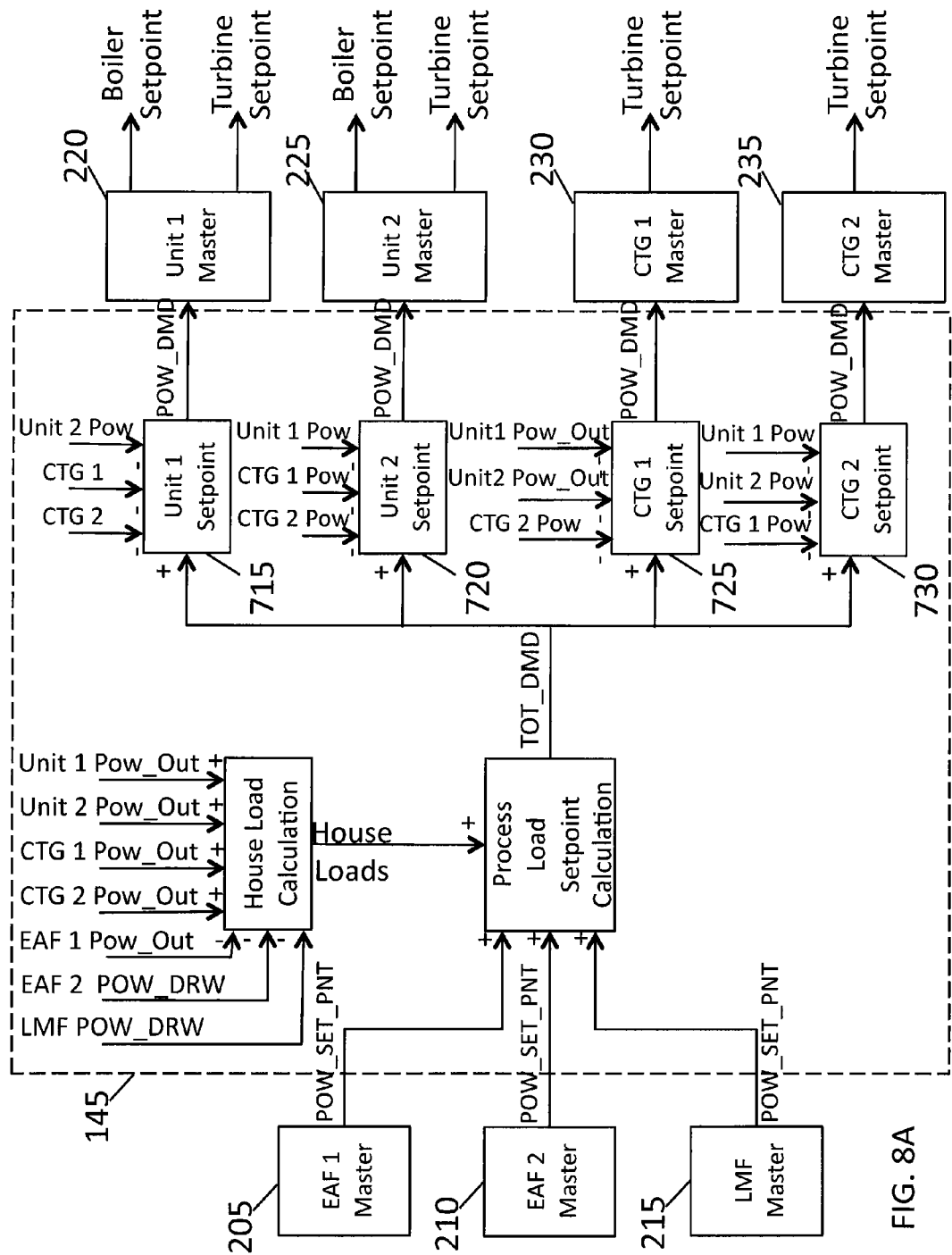
FIG. 8A illustrates, in a schematic diagram, a portion of the master system controller, shown in FIG. 3, in more detail.

Referring now specifically to FIG. 8A, the house load calculation module 705 generates a signal representing the house loads present in the power system 120, which equals the difference between the sum of the measured generator output powers and the sum of the measured load power draws. As shown, house load calculation module 705 adds together respective measured output powers from CFB/STG generator 125a (Unit 1 POW_OUT), CFB/STG generator 125b (Unit 2 POW_OUT), CTG generator 125c (CTG1 POW_OUT), and CTG generator 125d (CTG2 POW_OUT). From this total generator power output, house load calculation module 705 then subtracts respective power draws from each of electric arc furnace 130a (EAF1 POW_DRW), electric arc furnace 130b (EAF2 POW_DRW), and the ladle furnace 130c (LMF POW_DRW). Thus, the house load signal represents a residue of power consumption in the power system 120, for example, due to parasitic or other loads, such as safety or measurement equipment. The measured power outputs and draws can be provided to the house load calculation module 705, for example, by the power metering module 275 (FIG. 3).

The house load signal is received into process load set-point calculation module 710, together with respective power set-points from each electric arc furnace 130a and 130b (FIG. 4) and the ladle furnace 130c (FIG. 5). Process load set-point calculation module 710 sums the house load signal together with the power set-points for each of the arc furnaces 130a, 130b and ladle furnace 130c to generate a total load demand (TOT_LOAD_DMD) signal, which represents the total power demand of all the loads within the power system 120. The total load demand should be matched by the total power output of the generators 125a-d, in order to maintain power balance within the power system 120. The total load demand is apportioned to each of the generators 125a-d, to determine respective power output levels for each of the generators 125a-d, as follows.

The total load demand (TOT_LOAD_DMD) signal is provided to the unit 1 set-point calculation module 715, additionally with the measured power output from the other three generators operating in the power system 120, namely CFB/STG generator 125b and CTG generators 125c and 125d. The unit 1 set-point calculation module 715 subtracts the unit 2 POW_OUT, CTG1 POW_OUT and CTG2 POW_OUT signals from the TOT_LOAD_DMD signal, to generate the power demand (Unit 1 POW_DMD) control parameter for CFB/STG generator 125a (FIG. 6A). The power demand control parameter represents a target power output level for the CFB/STG generator 125a required to satisfy the total load demand, given the respective power outputs of the other generators 125b, 125c and 125d. The unit 1 set-point calculation module 715 automatically updates the Unit 1 POW_DMD because of feedback provided by the measured power outputs from generators 125b, 125c or 125d, if either the total load demand or any of the measured power outputs from generators 125b, 125c or 125d vary. However, during normal operation, the power demand control parameter for each of the two CFB/STG generators 125a and 125b can generally be equal (i.e., because the same feedback control is implemented in the two unit coordinators 220 and 225.

Unit 2 set-point calculation module 720 operates in substantially the same way, but calculates the POW_DMD control parameter for the unit coordinator 225. Thus, unit 2 set-point calculation module 720 subtracts measured power outputs of the CFB/STG generator 125a and the two CTG generators 125c and 125d from the total load demand signal, to generate the power demand control parameter for the unit coordinator 225 (FIG. 6A). In the same way, CTG set-point calculation modules 725 and 730 also generate POW_DMD control parameters for the two CTG master controllers 230 and 235 (FIG. 7), by subtracting measured power outputs of other each other generator from the total load demand signal. With this configuration of the set-point calculation modules 715, 720, 725 and 730, the total load demand within the power system 120 is automatically apportioned to the four operational generators 125a-d. Any shortfall (or surplus) between the measured power output of the generators 125a-d and the total load demand is reflected by a corresponding increase (or decrease) in the respective target output power levels of the generators 125a-d, as controlled by corresponding power demand control parameters.

Generator Output Capability Limits

Figure 8B:
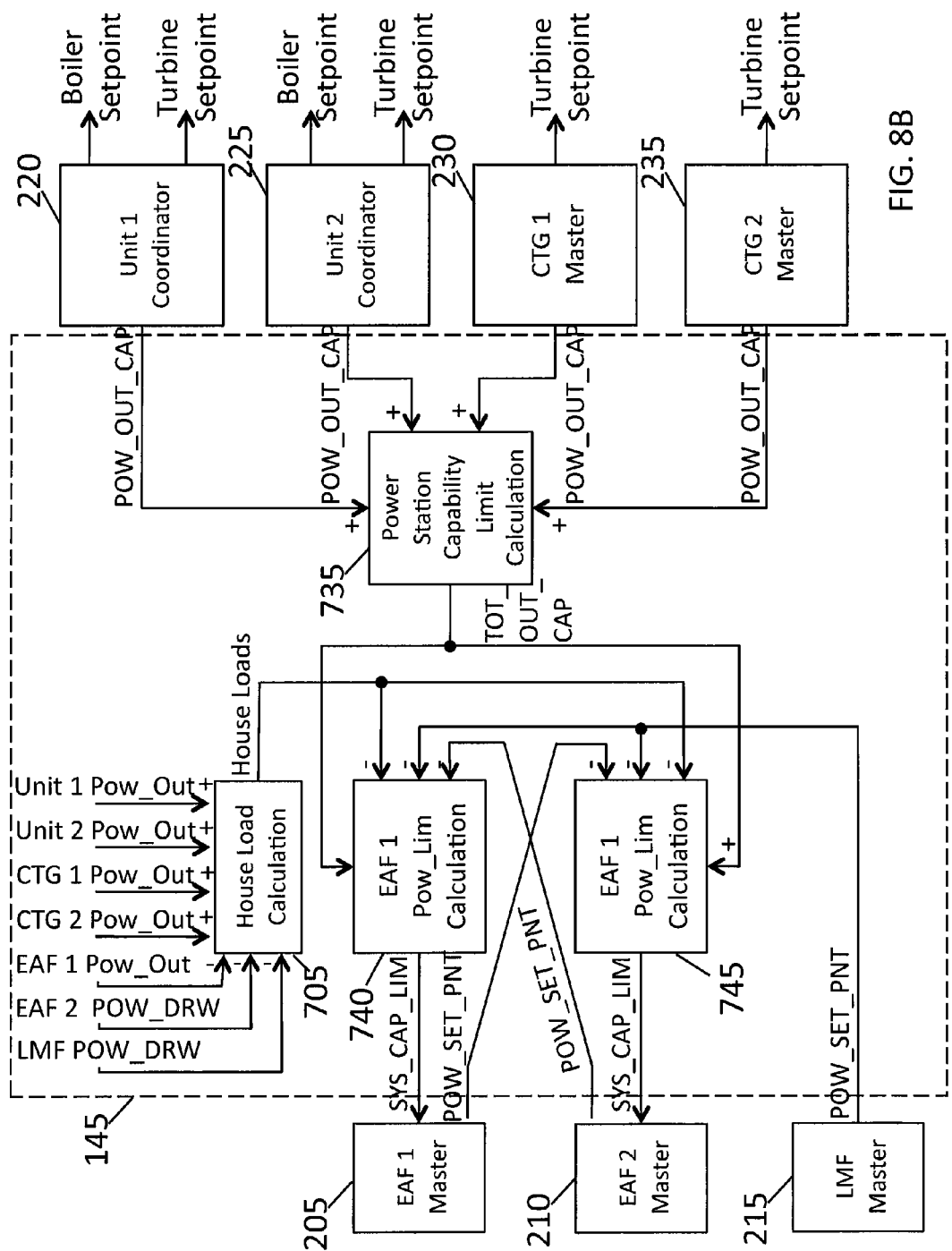
FIG. 8B illustrates, in a schematic diagram, another portion of the master system controller, shown in FIG. 3, in more detail.

Referring now specifically to FIG. 8B, the power station capability limit calculation module 735 is provided with a corresponding power output capability operating characteristic from each unit coordinator 220 and 225 (FIG. 6A) and each CTG master controller 230 and 235 (FIG. 7). Each corresponding power output capability, for a respective generator 125a-d, represents the maximum output power that the particular generator is capable of safely producing, given its input mechanical drive and the current condition of equipment and other safety systems installed in that generator, as described above. The output of power station capability limit calculation module 735 is the total system output capability (TOT_OUT_CAP) signal, and represents an upper limit on the total power output that the generators 125a-d are capable of safely producing.

A total system output capability (TOT_OUT_CAP) control parameter is used, as mentioned above, to reduce the respective power set-points of the electric arc furnaces 130a and 130b during generator runback, if necessary, so that power balance within the system 120 is maintained. Accordingly, the TOT_OUT_CAP signal is received into each of the EAF power limit calculation modules 740 and 745. The EAF power limit calculation module 740 generates the system capability limit (SYS_CAP_LIM) control parameter (FIG. 4) for the EAF controller 205 as the difference between the total system output capability and respective power set-points for the electric arc furnace 130b and ladle furnace 130c, also taking into account any house loads in the power system 120. Thus, neglecting the house loads, the system capability limit control parameter for the EAF 130a is calculated as the residue of total system capacity after the power set-points of the electric arc furnace 130b and ladle furnace 130c have been determined.

The EAF power limit calculation module 745 generates the system capability limit (SYS_CAP_LIM) control parameter (FIG. 4) for the EAF controller 210 using the same approach. Thus, the system capability limit control parameter for the electric arc furnace 130b is determined as the difference between the total system output capability and respective power set-points for the electric arc furnace 130a and ladle furnace 130c, again also taking into account any house loads in the power system 120. With this configuration of the EAF power limit calculation modules 740 and 745, in which the SYS_CAP_LIM control parameters are defined as respective residues of the total system output capability, total load power demand in the power system 120 is constrained by the total output power capability of the generators 125a-d.

Positive Ramp Rate Limits

Figure 8C:
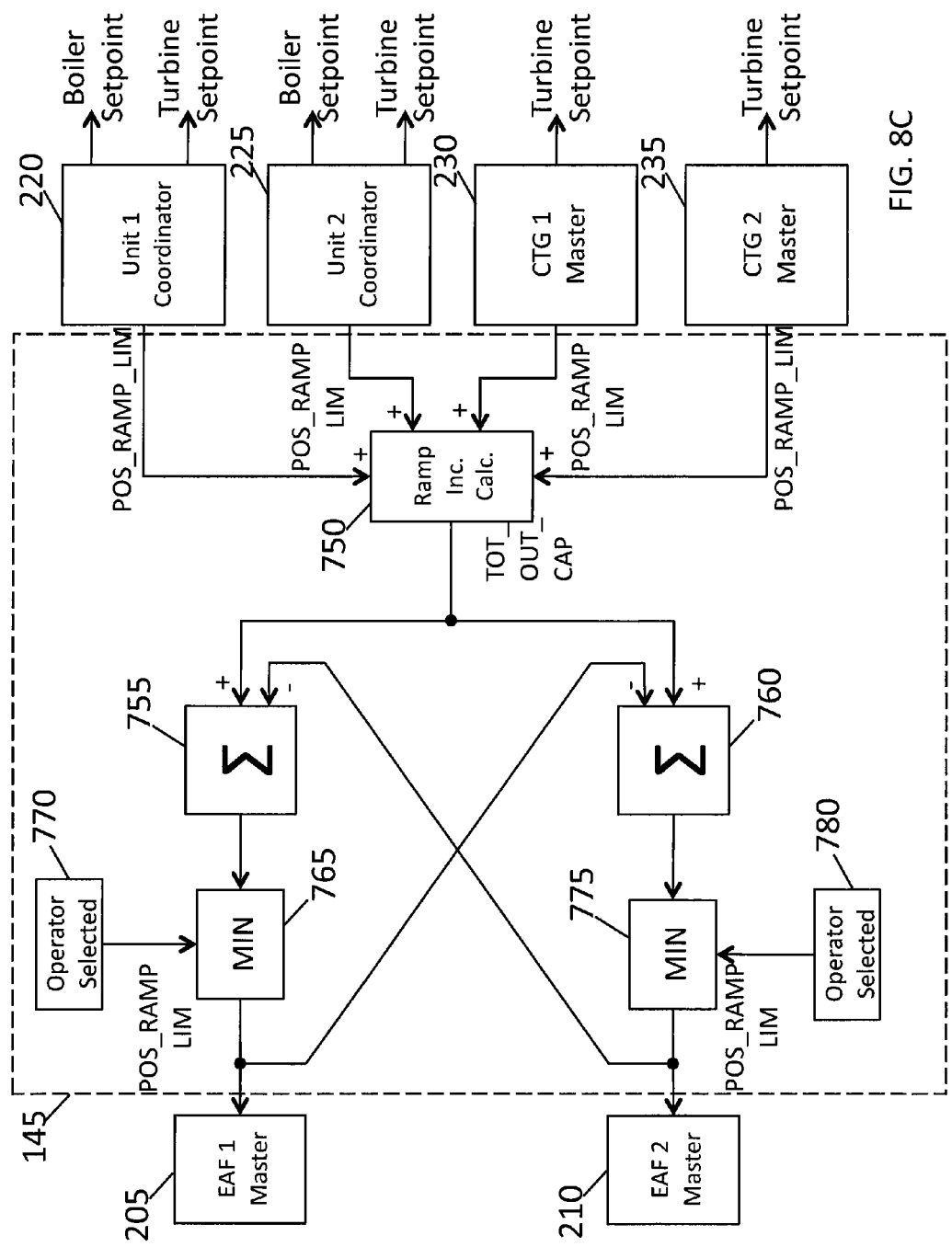
FIG. 8C illustrates, in a schematic diagram, another portion of the master system controller, shown in FIG. 3, in more detail.

Referring now specifically to FIG. 8C, a corresponding positive ramp rate limit (POS_RAMP_LIM) control parameter is passed into the ramp rate increase calculation module 750 by each unit coordinator 220 and 225 (FIG. 6A) and each CTG master controller 230 and 235 (FIG. 7). The rate ramp increase calculation module 750 generates a total positive ramp rate limit (TOT_POS_RAMP) signal, based on the respective positive ramp rate limits of the generators 125a-d. In an example embodiment, the ramp rate increase calculation module 750 can sum together the respective positive ramp rate limits. The total positive ramp rate limit represents an absolute limit on the rate at which the overall system load can be increased, and can be applied entirely to a single load (e.g., furnace 130a or 130b) assuming all other loads in the power system 120 are held constant. However, the total positive ramp rate limit can also be apportioned among different loads, as described below, to generate respective positive ramp rate limits for different loads, (e.g., furnaces 130a and 130b).

Accordingly, the total positive ramp rate limit (TOT_POS_RAMP) signal is passed into each of the summers 755 and 760. Summer 755 reduces the total positive ramp rate limit by the positive ramp rate limit for the electric arc furnace 130b (provided to EAF master controller 210), which is fed back to the summer 755. The output of summer 755 is provided to comparison block 765, wherein it is compared against an operator selected positive ramp rate limit 770, and the lesser of the two is provided to the EAF master controller 205 as the POS_RAMP_LIM control parameter for the electric arc furnace 130a (FIG. 4). The output of comparison block 765 is also fed back to the summer 760 to be subtracted from the total positive ramp rate limit. The output of summer 760 is provided to comparison block 775, wherein it is also compared against an operator selected positive ramp rate limit 780 (which can be different from operated selected positive ramp rate 770), and the lesser of the two is provided to the EAF master controller 210 as the POS_RAMP_LIM control parameter for the electric arc furnace 130b (FIG. 4).

With this configuration, positive ramp rate limits for each of the EAF master controllers 205 and 210 can be operator selected (i.e., using 770 and 780). However, if the sum of the operated-selected positive ramp rate limits 770 and 780 exceeds the total positive ramp rate limit, the feedback loops into the summers 755 and 760 constrain the positive ramp rate limit control parameters for the electric arc furnaces 130a and 130b not to exceed the total positive ramp rate limit for the generators 125a-d.

Negative Ramp Rate Limits

Figure 8D:
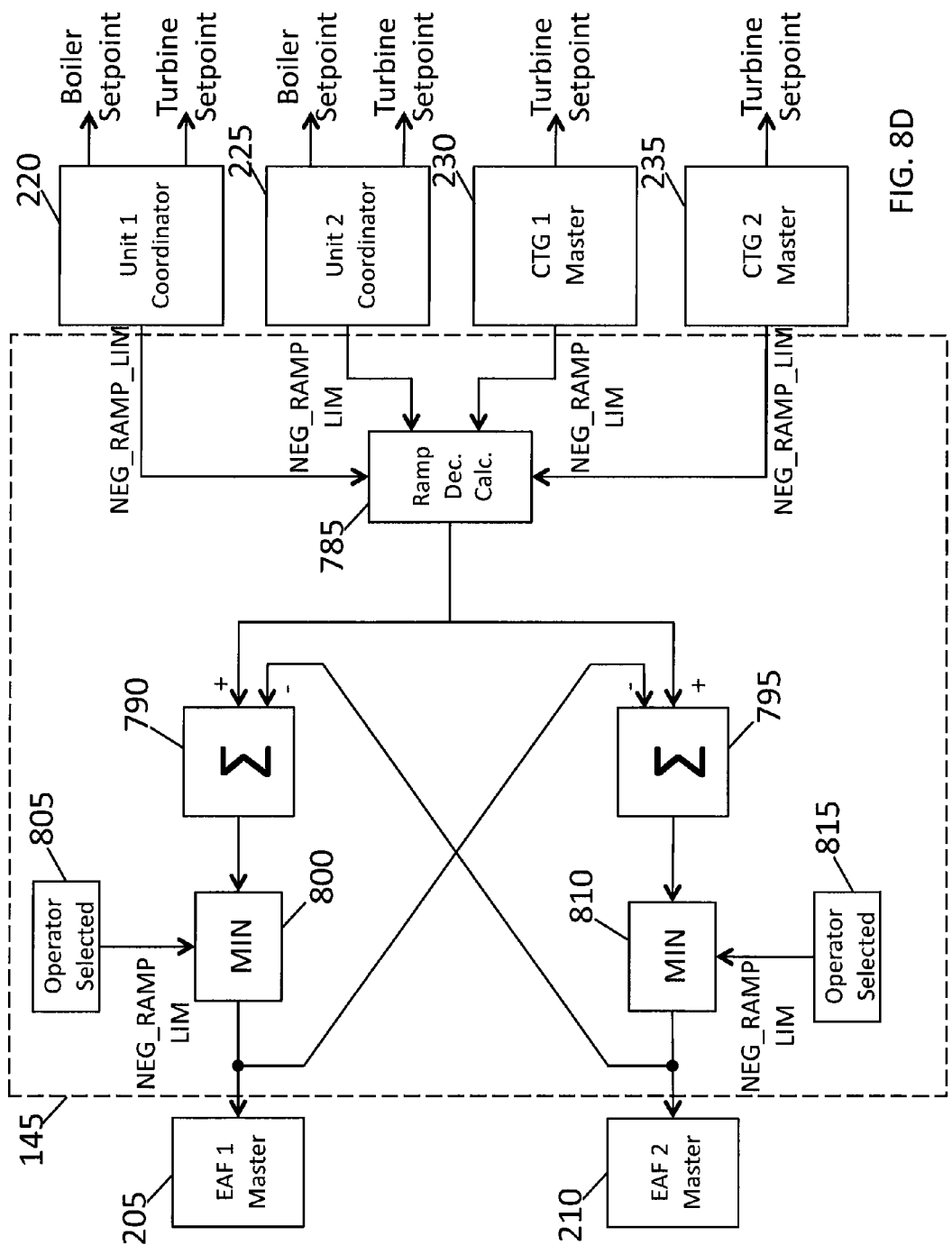
FIG. 8D illustrates, in a schematic diagram, another portion of the master system controller, shown in FIG. 3, in more detail.

Referring now specifically to FIG. 8D, a similar control is implemented for determining the effective negative ramp rate limits of the two electric arc furnaces 130a and 130b. As can be seen from FIG. 8D, the control configuration can be the same as that shown in FIG. 8C for determining positive ramp rate limits, except that ramp rate increase calculation module 750 can be replaced with ramp rate decrease calculation module 785.

Accordingly, a corresponding negative ramp rate limit (NEG_RAMP_LIM) control parameter is passed into the ramp rate decrease calculation module 785 by each unit coordinator 220 and 225 (FIG. 6A) and each CTG master controller 230 and 235 (FIG. 7). The rate ramp decrease calculation module 785 generates a total negative ramp rate limit (TOT_NEG_RAMP) signal, based on the respective negative ramp rate limits of the generators 125a-d. In an example embodiment, the ramp rate decrease calculation module 785 can sum together the respective negative ramp rate limits. The total negative ramp rate limit represents an absolute limit on the rate at which the overall system load can be decreased, and again can be applied entirely to a single load or apportioned among different loads, as described below, to generate respective negative ramp rate limits for different loads (e.g., furnaces 130a and 130b).

Accordingly, the total negative ramp rate limit (TOT_NEG_RAMP) signal is passed into each of the summers 790 and 795. Summer 790 reduces the total negative ramp rate limit by the negative ramp rate limit for electric arc furnace 130b (provided to EAF master controller 210), and which is fed back to the summer 790. The output of summer 790 is provided to comparison block 800, wherein it is compared against an operator selected negative ramp rate limit 805, and the lesser of the two is provided to the EAF master controller 205 as the NEG_RAMP_LIM control parameter for the electric arc furnace 130a (FIG. 4). The output of comparison block 800 is also fed back to the summer 795 to be subtracted from the total negative ramp rate limit. The output of summer 795 is provided to comparison block 810, wherein it is also compared against an operator selected negative ramp rate limit 815 (which can be different from operated selected negative ramp rate 805), and the lesser of the two is provided to the EAF master controller 210 as the NEG_RAMP_LIM control parameter for the electric arc furnace 130b (FIG. 4). The configuration again permits operator selection (i.e., using 805 and 815) of the negative ramp rate limits for each of the EAF master controllers 205 and 210, subject to constraint by the total negative ramp rate limit for the generators 125a-d.

Block Increase/Decrease

Figure 8E:
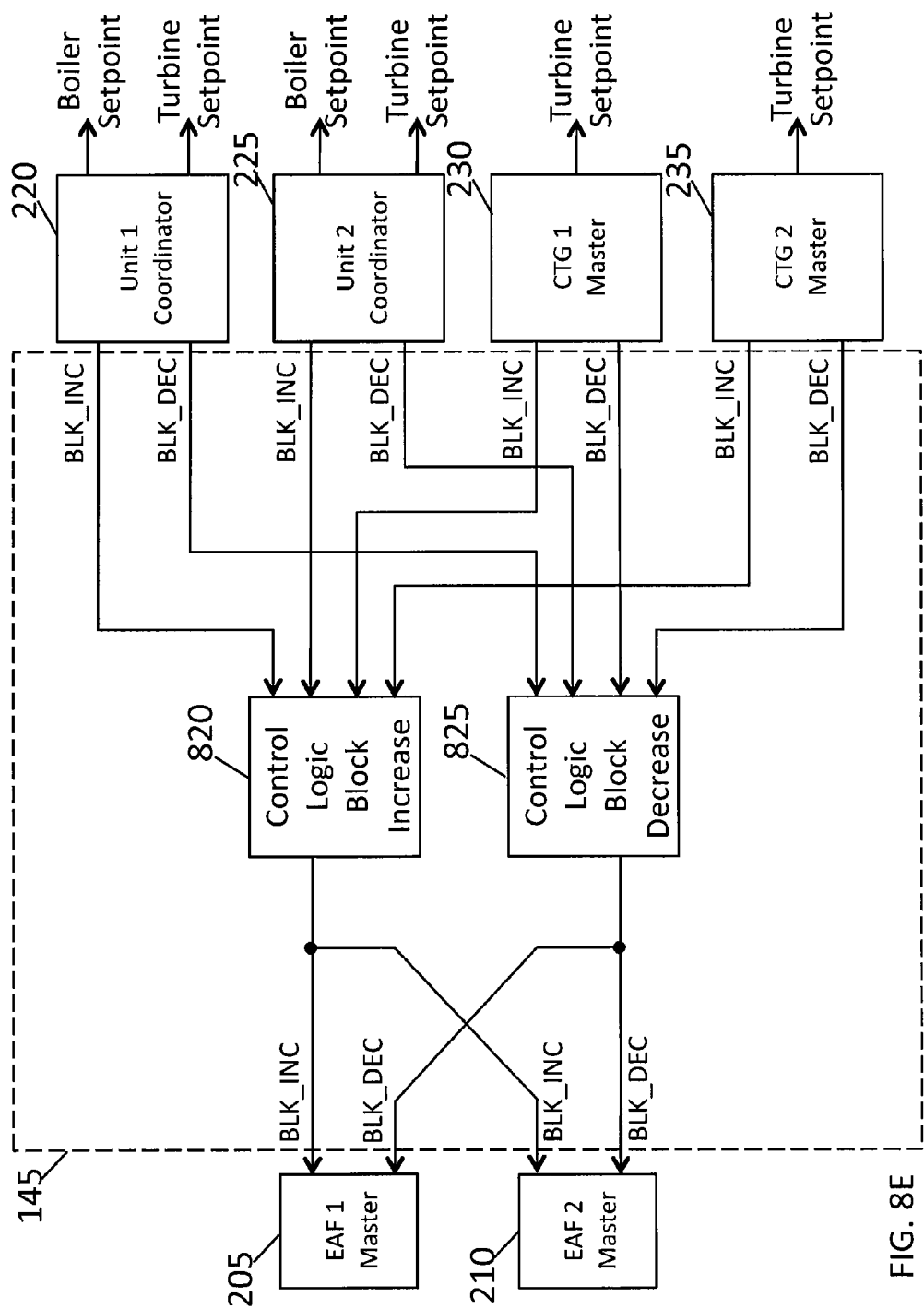
FIG. 8E illustrates, in a schematic diagram, another portion of the master system controller, shown in FIG. 3, in more detail.

Referring now specifically to FIG. 8E, the block increase control logic module 820 receives a corresponding block increase (BLK_INC) control parameter from each CFB/STG generator 125a and 125b (FIG. 6A) and each CTG generator 125c and 125d (FIG. 7). The block increase control logic module 820 determines the block increase (BLK_INC) control parameters for the EAF controllers 205 and 210 (FIG. 4) based on the received input. In an example embodiment, the block increase control logic module 820 can be implemented using an OR function, and its output provided to each EAF controller 205 and 210, so that each electric arc furnace 130a or 130b will have a ramp increase blocked if at least one generator 125a-d asserts a block increase. Thus, each generator 125a-d independently can impose block increases on the two electric arc furnaces 130a and 130b. However, it should be apparent that other logic functions could be implemented in the block increase control logic module 820 to generate the BLK_INC control parameters provided to the EAF master controllers 205 and 210 (FIG. 4).

Similarly, the block decrease control logic module 825 receives a corresponding block decrease (BLK_INC) control parameter from each CFB/STG generator 125a and 125b (FIG. 6A) and each CTG generator 125c and 125d (FIG. 7). The block decrease control logic module 825 determines the block decrease (BLK_INC) control parameters for the EAF controllers 205 and 210 (FIG. 4) based on the received input. In an example embodiment, the block increase control logic module 825 can again be implemented using an OR function, and its output provided to each EAF controller 205 and 210, so that each generator 125a-d can again independently impose block decreases on the two electric arc furnaces 130a and 130b. However, it should be apparent that other logic functions could be implemented in the block decrease control logic module 825.

Electrode Slip Initiation/Permission

Figure 8F:
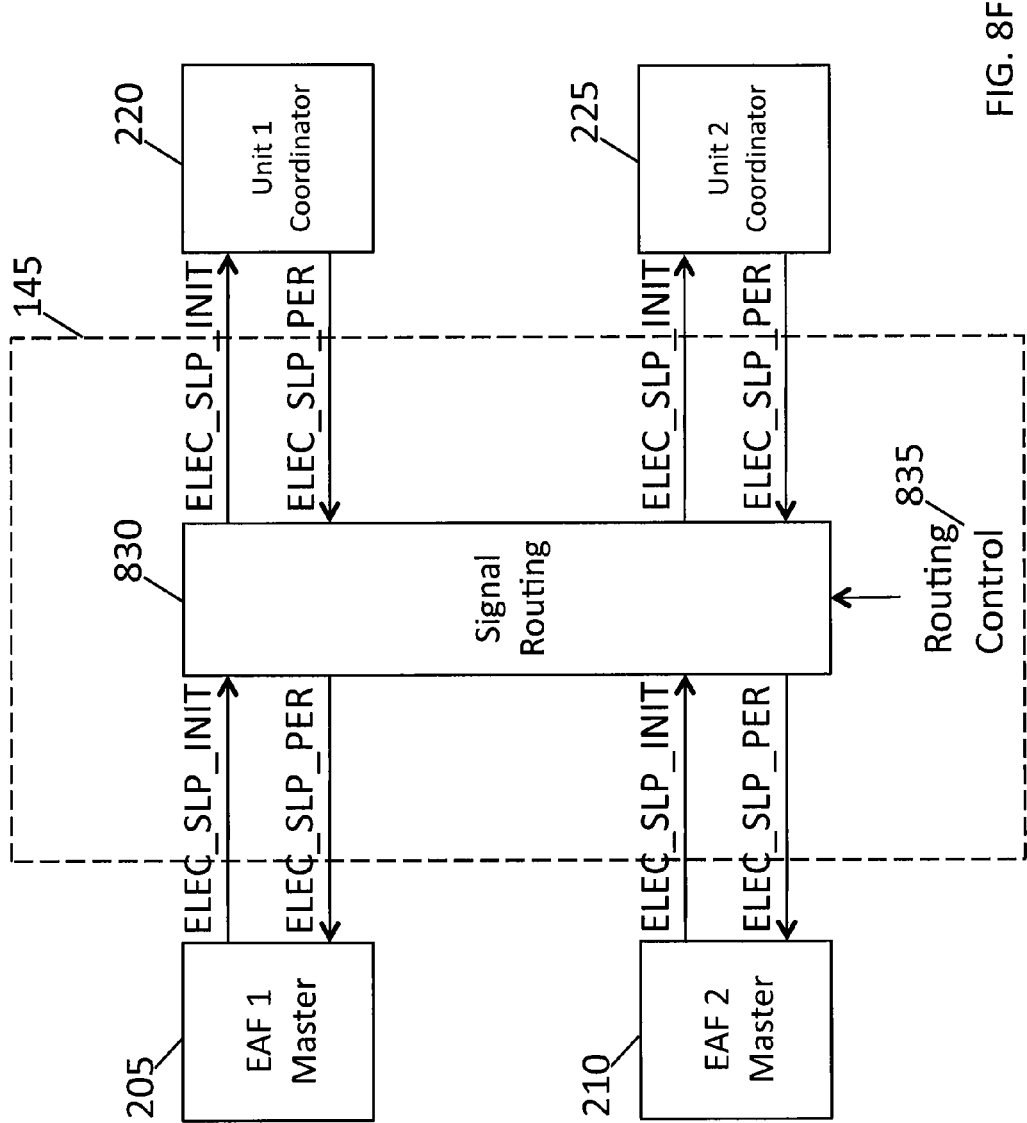
FIG. 8F illustrates, in a schematic diagram, another portion of the master system controller, shown in FIG. 3, in more detail.

Referring now specifically to FIG. 8F, signal routing 830 is used to allocate one of the unit coordinators 220 or 225 to handle an electrode slip or replacement operation initiated by one of the EAF controllers 205 or 210 (FIG. 4). Signal routing 830 receives the corresponding electrode slip initiated (ELEC_SLP_INIT) control parameters from each EAF controller 205 or 210 and, based upon the routing control signal 835, forwards the ELEC_SLP_INT control parameter to a selected unit coordinator 220 or 225. When the selected unit coordinator 220 or 225 (FIG. 6A) responds with a corresponding electrode slip permissive (ELEC_SLP_PER) control parameter, signal routing 830 forwards the permission to the initiating EAF controller 205 or 210. With this configuration, either unit coordinator 220 or 225 can be allocated (and pre-configured, as described above) to respond to an electrode slip or replacement operation initiated by either EAF controller 205 or 210.

Figure 9:
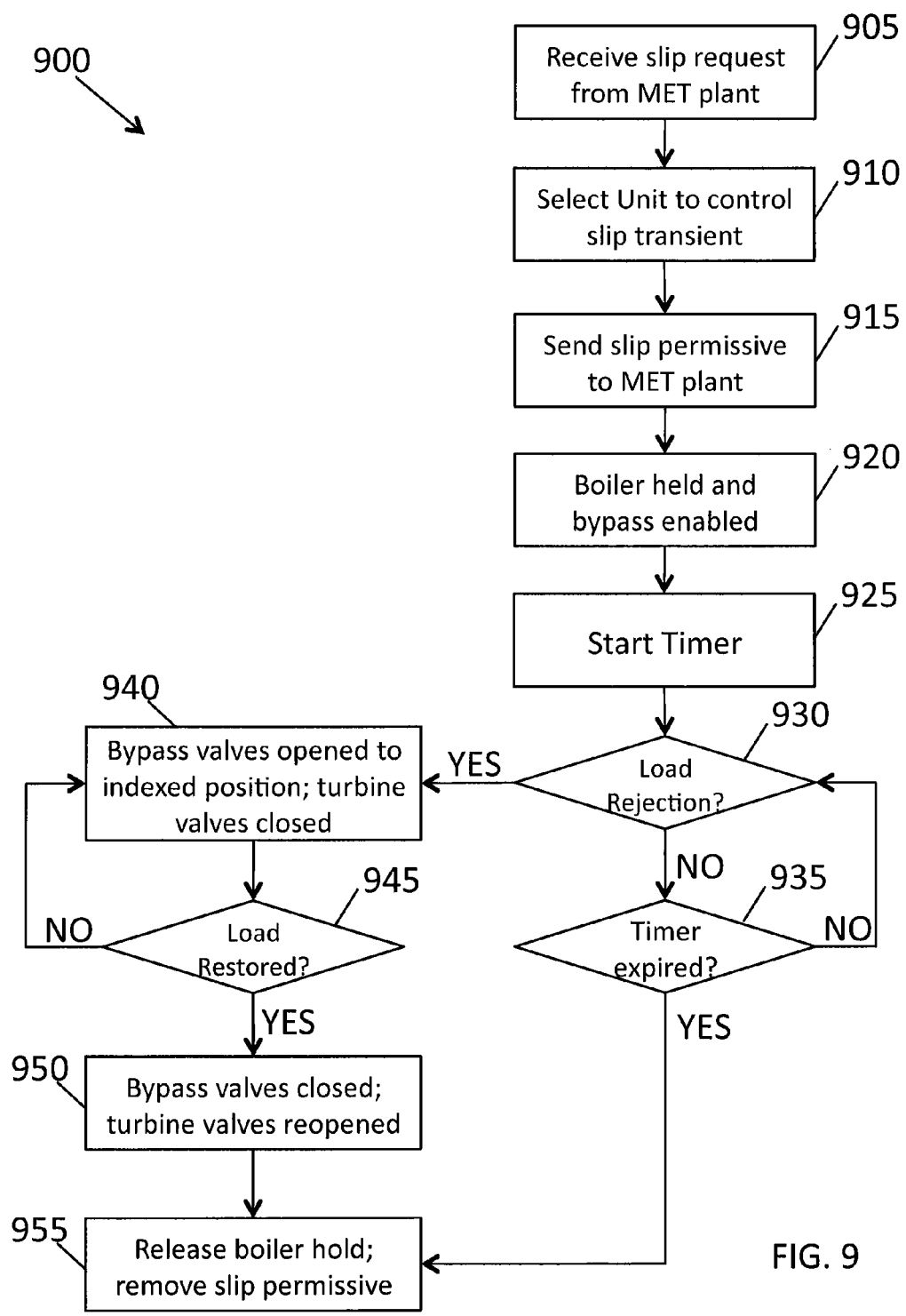
FIG. 9 illustrates, in a flow chart, a method of performing electrode slip or replacement using the control system shown in FIG. 3.

Reference is now made to FIG. 9, which illustrates a method 900 that can be used by the master system controller 145 to coordinate an electrode slip or replacement operation. At 905, an electrode slip request is initiated by one of the EAF controllers 205 or 210. At 910, a generator unit is selected to handle the slip or replacement operation. For example, signal routing 830 can be used to forward the request to one of the unit coordinators 220 or 225. At 915, permission for the electrode slip is granted and communicated to the initiating EAF controller 205 or 210. Again, signal routing 830 can be used.

At 920, a hold is placed on the boiler unit of the selected generator (e.g., CFB/STG generator 125a or 125b). The high-pressure by-pass system of the selected generator is also enabled so that the sudden load rejection associated with the electrode slip operation can be efficiently handled. At 925, a timer is started that limits the duration of time the initiating EAF controller 205 or 210 has to complete the operation. Time limiting the electrode slip operation, for example, prevents the selected generator's boiler unit from being indefinitely held at its present level.

At 930, it is determined whether load rejection (associated with the electrode slip or replacement) has occurred. If load rejection has not occurred, the method 900 proceeds to 935 to determine if the timer has expired. If it determined that the timer has expired before load rejection has occurred, the method 900 advances to 955, at which point the boiler hold is released and the electrode slip permission is removed. If it is otherwise determined that the timer has not expired, the method 900 returns to 930 to check for load rejection. If load rejection is never detected, method 900 remains in the loop defined between 930 and 935 until the timer expires and method 900 advances to 955.

However, if it is determined at 930 that load rejection has occurred (indicating that the electrode slip or replacement has commenced), the method 900 branches to 940. At 940, the bypass values are opened to an indexed position corresponding to the magnitude of the load rejection, and the turbine valves are closed so that excess steam in the boiler is routed to a condenser. Then at 945, it is determined whether the previously rejected load has been restored. If it is determined that the load has been restored, the method 900 advances to 950 where the bypass valves are closed and the turbine valves are opened again so that the generator unit returns to its pre-bypass operating conditions. Then at 955, the boiler hold is released and the electrode permission is removed. However, if at 945 it is determined that the load has not been restored, the method 900 holds at 940 until it is determined that the load has been restored.

The present invention has been described here by way of example only. Various modifications and variations may be made to these exemplary embodiments without departing from the spirit and scope of the invention, which is limited only by the appended claims.

The invention claimed is:

1. A control system for coordinating operation of a power system comprising at least one generator and at least one controllable load supplied by the at least one generator, the control system comprising:
   a generator controller associated with each at least one generator and responsive to generator control parameters for controlling the at least one generator to achieve an overall generator output;
   a load controller associated with each at least one load and responsive to load control parameters for controlling the at least one load to achieve an overall load set-point; and
   a master system controller communicatively linked to the generator controller and the load controller and configured to coordinate operation of the at least one generator with the at least one load by generating the load control parameters to achieve the overall load set-point based on an operating characteristic of the at least one generator, and by generating the generator control parameters to achieve the overall generator output based on an operating characteristic of the at least one load.

2. The control system of claim 1, wherein the generator controller and the load controller are each linked to the master system controller using a corresponding bilateral data communication line for providing the operating characteristic of the at least one generator and the operating characteristic of the at least one load to the master system controller.

3. The control system of claim 1, further comprising at least one generator sensor linked to the master system controller and associated with each at least one generator for monitoring the operating characteristic of the at least one generator, and at least one load sensor linked to the master system controller and associated with each at least one load for monitoring the operating characteristic of the at least one load.

4. The control system of claim 3, wherein the control system comprises at least two generators and at least two controllable loads, and wherein the master system controller is configured to generate the load control parameters, for each at least two loads, based further on the operating characteristic of each other of the at least two loads, and to generate the generator control parameters, for each at least two generators, based further on the operating characteristic of each other of the at least two generators.

5. The control system of claim 1, wherein each at least one generator is substantially isolated from a power grid.

6. The control system of claim 1, wherein the at least one load comprises a metallurgical plant.

7. The control system of claim 6, wherein the metallurgical plant comprises at least one electric arc furnace and/or at least one ladle furnace.

8. The control system of claim 1, wherein the operating characteristic of the at least one load comprises, for at least one load, a respective power set-point or load power draw.

9. The control system of claim 1, wherein the load control parameters comprise, for at least one load, a respective generator capability limit, a positive ramp rate limit, a negative ramp rate limit, a set-point block increase, or a set-point block decrease.

10. The control system of claim 1, wherein the operating characteristic of the at least one generator comprises, for at least one generator, a positive ramp rate limit, a negative ramp rate limit, a power output block increase, a power output block decrease, or a power output.

11. The control system of claim 1, wherein the generator control parameters comprise, for at least one generator, a respective power demand.

12. The control system of claim 1, wherein the master system controller is configured to generate the load control parameters and generator control parameters jointly to maintain a balance between power generation and power consumption within the power system.

13. A power system comprising:
   at least one generator responsive to generator control parameters for operation at an overall generator output;
   at least one controllable load supplied by the at least one generator and responsive to load control parameters for operation at an overall load set-point; and
   a master system controller coupled to and configured to coordinate operation of the at least one generator with the at least one load by generating the load control parameters to achieve the overall load set-point based on an operating characteristic of the at least one generator, and by generating the generator control parameters to achieve the overall generator output based on an operating characteristic of the at least one load.

14. The power system of claim 13, wherein the at least one generator and the at least one load are each linked to the master system controller using a corresponding bilateral data communication line for providing the operating characteristic of the at least one generator and the operating characteristic of the at least one load to the master system controller.

15. The power system of claim 13, further comprising at least one generator sensor linked to the master system controller and associated with each at least one generator for monitoring the operating characteristic of the at least one generator, and at least one load sensor linked to the master system controller and associated with each at least one load for monitoring the operating characteristic of the at least one load.

16. The power system of claim 15, wherein the power system comprises at least two generators and at least two loads, and wherein the master system controller is configured to generate the load control parameters, for each at least two loads, based further on the operating characteristic of each other of the at least two loads, and to generate the generator control parameters, for each at least two generators, based further on the operating characteristics of each other of the at least two generators.

17. The power system of claim 13, wherein the power system is substantially isolated from a power grid.

18. The power system of claim 13, wherein the at least one load comprises a metallurgical plant.

19. The power system of claim 18, wherein the metallurgical plant comprises at least one electric arc furnace and/or at least one ladle furnace.

20. The power system of claim 13, wherein the operating characteristic of the at least one load comprises, for at least one load, a respective power set-point or load power draw.

21. The power system of claim 13, wherein the load control parameters comprise, for at least one load, a respective generator capability limit, a positive ramp rate limit, a negative ramp rate limit, a set-point block increase, or a set-point block decrease.

22. The power system of claim 13, wherein the operating characteristic of the at least one generator comprises, for at least one generator, a positive ramp rate limit, a negative ramp rate limit, a power output block increase, a power output block decrease, or a power output.

23. The power system of claim 13, wherein the generator control parameters comprise, for at least one generator, a respective power demand.

24. The power system of claim 13, wherein the master system controller is configured to generate the load control parameters and generator control parameters jointly to maintain a balance between power generation and power consumption within the power system.

25. A method of coordinating operation of a power system comprising at least one generator and at least one controllable load supplied by the at least one generator, the method comprising:
monitoring an operating characteristic of the at least one generator;
monitoring an operating characteristic of the at least one load; and
coordinating operation of the at least one generator with the at least one load by generating load control parameters to achieve an overall load set-point based on the operating characteristic of the at least one generator, and by generating generator control parameters to achieve an overall generator output based on the operating characteristic of the at least one load.

26. The method of claim 25, wherein the power plant system comprises at least two generators and at least two controllable loads, and wherein the method further comprises generating the load control parameters, for each at least two loads, based further on the operating characteristics of each other of the at least two loads, and generating the generator control parameters, for each at least two generators, based further on the operating characteristics of each other of the at least two generators.

27. The method of claim 26, further comprising, for each at least two loads, generating respective load control parameters to attain respective load set-points of the at least two loads and, for each at least two generators, generating respective generator set-points to attain respective generator outputs of the at least two generators.

28. The method of claim 25, wherein each at least one generator is substantially isolated from a power grid.

29. The method of claim 25, wherein the at least one load comprises a metallurgical plant.

30. The method of claim 29, wherein the metallurgical plant comprises at least one electric arc furnace and/or at least one ladle furnace.

31. The method of claim 25, wherein the operating characteristic of the at least one load comprises, for at least one load, a respective power set-point or load power draw.

32. The method of claim 25, wherein the load control parameters comprise, for at least one load, a respective generator capability limit, a positive ramp rate limit, a negative ramp rate limit, a set-point block increase, or a set-point block decrease.

33. The method of claim 25, wherein the operating characteristic of the at least one generator comprises, for at least one generator, a positive ramp rate limit, a negative ramp rate limit, a power output block increase, a power output block decrease, or a power output.

34. The method of claim 25, wherein the generator control parameters comprise, for at least one generator, a respective power demand.

35. The method of claim 25, further comprising generating the load control parameters and the generator control parameters jointly to maintain a balance between power generation and power consumption within the power system.

36. A controller for coordinating operation of a power system comprising at least one generator and at least one controllable load supplied by the at least one generator, the controller comprising:
a generator interface for receiving a signal representative of an operating characteristic of the at least one generator and for providing generator control parameters to a generator controller associated with the at least one generator, the generator controller responsive to the generator control parameters for achieving an overall generator output of the at least one generator;
a load interface for receiving a signal representative of an operating characteristic of the at least one load and for providing load control parameters to a load controller associated with the at least one load, the load controller responsive to the load control parameters for achieving an overall load set-point of the at least one load; and
a processor configured to provide integrated control of the at least one generator and the at least one load by determining the load control parameters to achieve the overall load set-point based on the operating characteristic of the at least one generator, and by determining the generator control parameters to achieve an overall generator output based on the operating characteristic of the at least one load.

37. A power plant comprising:
at least one generator configured to supply power to at least one controllable load, the at least one generator responsive to generator control parameters for operation at an overall generator output and the at least one load responsive to load control parameters for operation at an overall load set-point; and
a master system controller coupled to and configured to coordinate operation of the at least one generator with the at least one load by generating the load control parameters to achieve the overall load set-point based on an operating characteristic of the at least one generator, and by generating the generator control parameters to achieve the overall generator output based on an operating characteristic of the at least one load.

* * * * *